(12) United States Patent
Desroches et al.

(10) Patent No.: US 9,926,068 B2
(45) Date of Patent: Mar. 27, 2018

(54) DRAG NEUTRAL VEHICLE WINDOW

(71) Applicant: BOMBARDIER INC., Dorval (CA)

(72) Inventors: Alexandre Desroches, Laval (CA);
David Lencz, Pointe-Claire (CA);
Franck Dervault, Montreal (CA)

(73) Assignee: BOMBARDIER INC., Dorval, Quebec (CA)

( * ) Notice: Subject to any disclaimer, the term of this patent is extended or adjusted under 35 U.S.C. 154(b) by 437 days.

(21) Appl. No.: 14/364,206

(22) PCT Filed: Dec. 18, 2012

(86) PCT No.: PCT/IB2012/057441
§ 371 (c)(1),
(2) Date: Jun. 10, 2014

(87) PCT Pub. No.: WO2013/093784
PCT Pub. Date: Jun. 27, 2013

(65) Prior Publication Data
US 2014/0314973 A1 Oct. 23, 2014

Related U.S. Application Data

(60) Provisional application No. 61/578,575, filed on Dec. 21, 2011.

(51) Int. Cl.
*B64C 1/14* (2006.01)
*B60J 1/00* (2006.01)
(Continued)

(52) U.S. Cl.
CPC ............ *B64C 1/1484* (2013.01); *B60J 1/007* (2013.01); *B64C 1/1492* (2013.01); *E06B 3/66* (2013.01);
(Continued)

(58) Field of Classification Search
CPC ...... B64C 1/1484; B64C 1/1492; B60J 1/007; E06B 3/66; E06B 7/16; B32B 17/10055; B32B 17/10165
See application file for complete search history.

(56) References Cited

U.S. PATENT DOCUMENTS 4,204,374 A * 5/1980 Olson ................. B32B 27/08
244/121
4,557,440 A 12/1985 Adams
(Continued)

FOREIGN PATENT DOCUMENTS

EP 0322776 7/1989
EP 2193991 A2 6/2010
(Continued)

OTHER PUBLICATIONS

Chinese Office Action dated Mar. 9, 2016, for Chinese Patent Application No. 201280063882.5.
(Continued)

*Primary Examiner* — Donald J Loney
(74) *Attorney, Agent, or Firm* — Karceski IP Law, PLLC

(57) ABSTRACT

A window for a vehicle includes at least one transparent pane suspendable within a frame. The transparent pane comprises a deformable material. The transparent pane defines a first surface position $h_1$ when not subjected to a pressure differential thereacross and a second surface position $h_2$ when subject to the differential pressure thereacross. The first and second surface positions are defined with reference to an outside mold line. The first surface position $h_1$ defines a reverse curvature with respect to the outside mold line. In response to the differential pressure $\Delta P$, the second surface position $h_2$ includes bulging of the transparent pane by a predetermined distance $\Delta h$. The frame is constructed to be positioned within the vehicle such that the transparent pane presents a surface, when subjected to the
(Continued)

pressure differential ΔP, that is substantially consistent with the outside mold line of the vehicle.

11 Claims, 15 Drawing Sheets

(51) Int. Cl.
  *E06B 3/66* (2006.01)
  *E06B 7/16* (2006.01)
  *B32B 17/10* (2006.01)

(52) U.S. Cl.
  CPC .......... *E06B 7/16* (2013.01); *B32B 17/10055* (2013.01); *B32B 17/10165* (2013.01); *Y10T 29/49764* (2015.01); *Y10T 428/24628* (2015.01)

(56) References Cited

U.S. PATENT DOCUMENTS

| | | | |
|---|---|---|---|
| 4,932,608 A * | 6/1990 | Heidish | .................. B32B 17/10 |
| | | | 244/129.3 |
| 5,988,566 A | 11/1999 | Meyer | |
| 6,168,112 B1 | 1/2001 | Mueller et al. | |
| 7,118,070 B2 | 10/2006 | Abrams et al. | |
| 7,281,686 B2 | 10/2007 | Wood | |
| 7,552,896 B2 | 6/2009 | Coak | |
| 7,968,170 B2 | 6/2011 | Albers et al. | |
| 2006/0123718 A1 * | 6/2006 | Paspirgilis | ............ B64C 1/1492 |
| | | | 52/204.1 |
| 2007/0181746 A1 | 8/2007 | Wood | |
| 2007/0194177 A1 | 8/2007 | Coak | |
| 2008/0078494 A1 | 4/2008 | Nordman | |
| 2012/0325344 A1 * | 12/2012 | Chaumel | ............... B64C 1/1492 |
| | | | 137/557 |
| 2013/0313366 A1 | 11/2013 | Hoffa et al. | |

FOREIGN PATENT DOCUMENTS

| | | |
|---|---|---|
| FR | 2954393 | 6/2011 |
| GB | 2431960 A | 5/2007 |
| WO | WO 2008039230 A3 | 4/2008 |
| WO | WO 2012066264 A1 | 5/2012 |

OTHER PUBLICATIONS

International Search Report and Written Opinion, dated Apr. 25, 2013, for International Patent Application No. PCT/IB2012/057441.
Pinnell, United States Statutory Invention Registration No. H451, published Apr. 5, 1988, "Framless Transparencies for Aircraft Cockpit Enclosure".
Chinese Office Action dated Jul. 2, 2015, for Chinese Patent Application No. 201280063882.5.
European Office Action dated Apr. 29, 2016, for European Patent Application No. 12830870.7.
European Office Action dated Jul. 3, 2017, for European Patent Application No. 12830870.7.

* cited by examiner

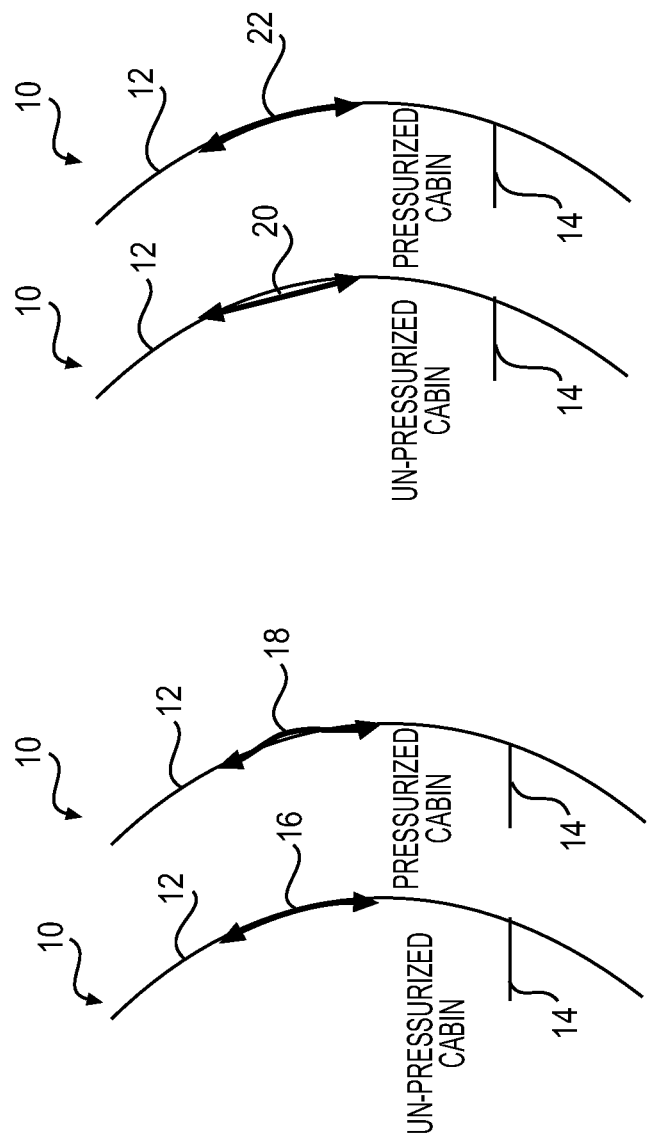

| PROPERTY | Units | STRETCHED ACRYLIC MIL-P-25690A |
|---|---|---|
| MOLULUS OF ELASTICITY | psi | $0.55 \times 10^{-6}$ |
| POISSON'S RATIO | n/a | 0.35 |
| TENSILE STRENGTH | psi | 11000 min |
| SHEAR STRENGTH | psi | 3000 min |

*FIG. 12*

$C_D = 15 \, (h/L)^2$ $C_D$ IS BASED ON FRONTAL AERA

DRAG PER WINDOW = $C_D * A / A_{ref} * q / q_{ref}$

WHERE: $A_{ref}$ = REFERENCE FRONTAL AREA

A IS FRONTAL AERA

DRAG NEUTRAL VEHICLE WINDOW

CROSS-REFERENCE TO RELATED APPLICATION(S)

This is a National Stage Entry into the United States Patent and Trademark Office from International PCT patent application Ser. No. PCT/IB2012/057441, having an international filing date of Dec. 18, 2012, which claims priority to U.S. Provisional Patent Application No. 61/578,575, filed on Dec. 21, 2011, the entire contents of both of which are incorporated herein by reference.

FIELD OF THE INVENTION

The present invention concerns pressurized vehicle windows. Specifically, the present invention concerns a drag neutral aircraft window and constructions for the same.

DESCRIPTION OF THE RELATED ART

The traditional manufacture of aircraft windows has resulted in windows that are small in size. There are several reasons for this, some of which were born from the experiences learned from one of the first commercial jet airliners, the de Havilland DH 106 Comet.

As should be familiar to those skilled in the art, the de Havilland DH 106 Comet first flew in 1949 and was equipped with large windows.

A few years after its introduction, however, the Comet airframes started to experience catastrophic metal fatigue, which was attributed to: (1) cyclic cabin pressurization, and (2) the size, placement, and construction of the large windows that the jet airliner showcased. Due to metal fatigue, it was reported that two of the Comet jet airliners broke apart in flight.

Lessons learned from this experience resulted in changes in the design, installation, and size of windows for commercial jet airliners. Many of the engineering choices for the redesign of jet airliner windows, due to the experiences with the Comet and subsequent studies, lead to the window design(s) with which the public is familiar today.

As should be apparent to those skilled in the art, a standard construction for a jet aircraft provides windows on each side of the aircraft, approximately at the location of each of the rows of seats in the aircraft.

So that changes in pressure do not impose too great a stress on the window or on the portion of the outside mold line (also referred to as the fuselage or structural exterior surface in which the window is installed), windows are conventionally designed to be modest in size. Moreover, to adequately contain the pressure applied to the window when the aircraft is at a cruising altitude, aircraft windows typically are quite thick in their designs.

In addition, windows typically are constructed of multiple panes so that, if the exterior pane should rupture during flight, the interior pane will act as a redundant pane to prevent depressurization of the interior cabin of the aircraft.

As should be apparent to any passenger, aircraft windows are quite small. The small size is due, at least in part, to engineering constraints placed thereupon. Specifically, the smaller the window, the greater the strength of the window, therefore the greater its ability to resist failure. Accordingly, aircraft designers incorporate smaller windows to assure that the windows provide sufficient strength to avoid failure.

Smaller windows also are lighter in weight and cost less to produce than larger windows, using conventional materials and construction techniques. Therefore, smaller windows are stronger, lighter, and cheaper than larger alternatives. At least for these reasons, the industry has moved toward smaller windows for aircraft.

One downside to smaller windows is that they offer limited exterior visibility to passengers in the aircraft. In addition, due to their multi-pane design, aircraft windows create a tunnel view from the interior of the aircraft to the exterior. While not detrimental in any way to visibility, this tunnel view tends to enhance the sense that the window is small and cramped.

As should be apparent to those skilled in the art, when a material is subjected to internal pressure, the material expands like a balloon. In the case of the aircraft fuselage, which is made from an aluminum alloy, the expansion is negligible. In the case of windows, which are typically made from a polymeric material, the expansion is measurably greater.

Whenever the exterior shape of the aircraft is altered, the change in shape alters the aerodynamic properties of the aircraft. When changes occur in the curvature of a window at altitude, these changes reduce the aerodynamic efficiency of the aircraft, thereby adding drag.

As a result, the prior art includes discussions of aircraft window designs that minimize any changes in curvature of the pane at the exterior of the aircraft. By minimizing changes in the curvature of the windows, designers impose minimal changes in the aerodynamic properties of the aircraft as a whole.

As also should be apparent to those skilled in the art of aircraft design, weight is a consideration for any equipment that is placed on an aircraft. Greater weight requires a greater amount of fuel for the aircraft to transit from its point of origin to its destination. Accordingly, greater weight translates to increased fuel usage and, therefore, reduced fuel efficiency.

As should be apparent to those skilled in the art, aircraft designers seek to balance competing factors such as wind resistance (i.e., drag), weight, fuel usage, window size, etc., when designing an aircraft. Often, as in the case with windows, there are considerable trade-offs between the weight and size of the windows. As a rule of thumb, the larger the window, the greater the weight of the window. The weight of each window also places limitation on the size of the window.

As noted above, not only does the weight of the window factor into the design of an aircraft, so does the impact that the window may have on the aerodynamic properties of the aircraft.

In this context, U.S. Patent Application Publication No. 2006/0123718 (hereinafter the '718 application) describes a window element for insertion in a window aperture. That patent application describes that the outward bowing (i.e., bulging) of a window during flight is a known phenomenon. (The '718 application at paragraph [0003].) The '718 application also discusses that deformation of the window during flight increases the drag on the aircraft and is, therefore, disadvantageous. (The '718 application at paragraph [0003].)

As described in the '718 application, the outer skin of the aircraft fuselage airframe frequently has material thicknesses in different sections of the fuselage. (The '718 application at paragraph [0011].) Thus, outer panes of the window elements are not always completely flush with the outer skin in all sections of the aircraft fuselage. (The '718 application at paragraph [0011].)

The '718 application also describes that the pressure difference at flying altitudes produces a buckling or bulging of the outer pane of the window, which can be up to 4 mm over the outer strake. (The '718 application at paragraph [0011].) These described aerodynamic effects result in perturbations of the airflow around the fuselage of the airframe, which can considerably impair the aerodynamic quality of the outer skin of the fuselage, especially where large numbers of window elements are used in the construction of the fuselage airframe. (The '718 application at paragraph [0011].)

Having identified this problem, the '718 application provides a cover pane 10 with the supporting frame 9 for the window. (The '718 application at paragraph [0030].) The cover pane 10 has a material thickness that approximately corresponds to the material thickness of the outer skin 5 of the aircraft fuselage. (The '718 application at paragraph [0030].) As such, the cover pane 10 remains flush with the outer skin 5 of the aircraft fuselage. (The '718 application at paragraph [0030].)

As understood from the reference, the cover pane 10 is arranged a short distance in front of the outer pane 26 so that the outer pane 26 does not come into contact with the cover pane 10, even under maximum bulging. (The '718 patent at paragraph [0037].) According to the reference, this ensures a substantially flush and, therefore, aerodynamically favorable integration of the window element 1 in the outer skin 5 of the aircraft fuselage. (The '718 patent at paragraph [0037].)

As should be apparent from the foregoing discussion, the '718 application addresses the problem of window bulging by placing a cover pane 10 (i.e., an exterior pane) over the window. Since the interior and exterior surfaces of the cover pane 10 are maintained at the same pressure, regardless of the altitude, the cover pane 10 is not altered in its shape. As a result, regardless of the actual shape of the outer pane 26, the cover pane 10 maintains the aerodynamic properties of the aircraft fuselage.

As should be immediately apparent, the addition of the cover pane 10 to the window element 1 adds weight to the window element 1. Therefore, the window element 1 that is described in the '718 application suffers at least from this disadvantage.

Other designs for windows for aircraft also are known in the art. As with the '718 application, these designs also rely on constructions that minimize flexion of the exterior pane of a multi-pane window unit for an aircraft.

For example, U.S. Pat. No. 4,932,608 (hereinafter the '608 patent) describes an aircraft windshield design where the window assembly 10 includes an outer glass ply 12 and an inner ply 14, which are separated from one another by an air gap 16. (The '608 patent at col. 2, lines 24-34.) The gap 16 provides a thermal barrier between the glass ply 12 and the laminate 14 and allows the outer glass ply 12 to carry the internal pressure load of the pressurized aircraft cabin. (The '608 patent at col. 2, lines 34-38.)

For the '608 patent, the window assembly includes an outer glass ply laminate 12 and an inner polycarbonate laminate 14. (The '608 patent at col. 3, lines 28-35.) The inner polycarbonate laminate 14 is more flexible than the outer glass laminate 12 and, therefore, is expected to bulge more than the outer glass laminate 12. The pressurized gap 16 reduces the bulging of the inner polycarbonate laminate 14 by equalizing (or nearly equalizing) the pressure in the gap 16 with the pressure in the aircraft cabin. (The '608 patent at col. 3, lines 63-67.) In an alternative embodiment, the pressure in the gap 16 is kept at a pressure of about 1 psi less than the pressure within the aircraft cabin, thereby preventing leakage of the pressurizing gas into the aircraft cabin. (The '608 patent at col. 4, lines 2-7.)

As the '608 patent emphasizes, the aerodynamic properties for the aircraft are maintained as a result of the stiff (i.e., non-bulging) properties of the outer glass laminate 12. As should be apparent to those skilled in the art, laminates that incorporate glass tend to be heavy and, therefore, add weight to the aircraft. Accordingly, this solution suffers from at least one drawback in that the window construction is anticipated to add weight to the aircraft.

U.S. Pat. No. 5,988,566 (hereinafter "the '566 patent") describes an aircraft window construction. In its background section, the '566 patent describes how window components are not supposed to protrude outside of the outer skin of the aircraft body to avoid any adverse influence of the window on the aerodynamic characteristics of the aircraft. (The '566 patent at col. 1, lines 21-26.)

In the conventional aircraft window, such as the one described by the '566 patent, the strong, outer window pane takes up the cabin pressure under normal operating conditions. (The '566 patent at col. 1, lines 38-41.) The inner pane does not take up the cabin pressure under normal operating conditions. Instead, the inner pane is designed to take up the cabin pressure only in the event of a failure of the outer pane. (The '566 patent at col. 1, lines 55-57.) To equalize pressure between the inner pane and the outer pane, a small hole is provided in the inner pane. (The '566 patent at col. 1, lines 49-53.)

The '566 patent provides a construction for an aircraft window pane where a pressure device is connected to the air space between the inner pane and the outer pane to control the pressure in that space. (The '566 patent at col. 3, lines 15-20.) Specifically, the pressure device equalizes the pressure in the space between the panes so that the pressure between the window panes is equal to the pressure outside of the aircraft. (The '566 patent at col. 4, lines 11-16.) As such, cyclic pressure on the outer pane is eliminated (or at least greatly reduced).

U.S. Pat. No. 7,968,170 (hereinafter "the '170 patent") describes a composite pane structure that may be used as a part of the structure of the aircraft, the skin panel being a transparent composite material. (The '170 patent at col. 2, lines 10-24.) As a structural member, the transparent panel provides for windows of a significantly larger size. (The '170 patent at col. 2, lines 20-24.)

Each of these prior art approaches to windows offer solutions whereby the window pane exposed to the external environment is as rigid as possible to avoid bulging during flight.

SUMMARY OF THE INVENTION

The aircraft window of the present patent application is intended to address one or more of the deficiencies noted with respect to the prior art.

Specifically, the aircraft window of the present invention seeks to minimize the impact of window bulging on the aerodynamic properties of an aircraft while minimizing the weight penalty.

The present invention broadly concerns itself with a drag neutral aircraft window where the phenomenon of window bulging is viewed advantageously, rather than disadvantageously.

Specifically, the present invention provides an aircraft window that is permitted to bulge during flight and, as a result of that bulging, establish a drag neutral configuration for the aircraft. In other words, the window of the present invention is designed to bulge in flight and, as a result of the bulging, assume the proper shape to provide the aircraft with the appropriate aerodynamic configuration in the cruise condition.

In one embodiment, the present invention provides a window for a pressurized vehicle that includes at least one transparent pane for suspension within a frame. The transparent pane is made from a deformable material. The transparent pane defines a first surface position $h_1$ when not subjected to a pressure differential thereacross and a second surface position $h_2$ when subject to the differential pressure thereacross. The first and second surface positions are defined with reference to an outside mold line of the aircraft. The first surface position $h_1$ defines a reverse curvature with respect to the outside mold line. In response to the differential pressure $\Delta P$, the second surface position $h_2$ includes bulging of the transparent pane by a predetermined distance $\Delta h$ from the first surface position $h_1$. The frame is constructed to be positioned within the vehicle such that the transparent pane presents a surface, when subjected to the pressure differential $\Delta P$, that is substantially consistent with the outside mold line of the vehicle.

It is contemplated that the first surface position $h_1$ may lie between about 0.17 and 0.06 inches (4.32 and 1.52 mm), between about 0.16 to 0.07 inches (4.06 to 1.78 mm), and/or between about 0.15 to 0.08 inches (3.81 to 2 mm).

In selected embodiments, the first surface position $h_1$ may be about 0.17 inches (4.32 mm), about 0.16 inches (4.06 mm), about 0.15 inches (3.81 mm), about 0.08 inches (2 mm), about 0.07 inches (1.78 mm), about 0.06 inches (1.52 mm), and/or about 0.05 inches (1.27 mm).

It is contemplated that the second surface position $h_2$ may lie between about 0.08 and −0.03 inches (2 and −0.76 mm), between about 0.07 to −0.02 inches (1.78 to −0.51 mm), and/or between about 0.06 to −0.01 inches (1.52 to −0.25 mm).

In selected embodiments, the second surface position $h_2$ may be about 0.06 inches (1.52 mm) and/or about −0.01 inches (−0.25 mm).

The second surface configuration may be substantially drag neutral.

In one embodiment, the at least one transparent pane includes a first transparent pane, a second transparent pane, and an air gap separating the first transparent pane from the second transparent pane.

It is also contemplated that the window may include a seal surrounding the first and second panes and providing an intermediate section disposed between the first and second panes.

In addition, the present invention provides for a window where the at least one transparent pane has a first transparent pane, a second transparent pane, and a transparent, solid interlayer between the first transparent pane to the second transparent pane. The first transparent pane, the second transparent pane, and the interlayer may be formed as a unitary structure. The interlayer may be urethane.

For the present invention, the at least one transparent pane may be made from glass, a transparent polymer, cast acrylic, stretched acrylic, and/or polycarbonate, among other materials.

It is contemplated that the window may include a bolted fastener system, with a plurality of nuts and bolts disposed around a periphery of the frame, providing at least connectivity between the frame and the vehicle.

The window also may include a plugged fastener system, with a plurality of clips disposed around a periphery of the frame, providing at least connectivity between the frame and the at least one transparent pane.

The present invention also encompasses an aircraft that incorporates one or more of the embodiments of the window discussed herein.

The present invention also encompasses a method for configuring a window for an aircraft. The method includes determining an initial thickness of a window pane, defining a deflection of the window pane at a pressurized condition based on the initial thickness, defining a reverse curvature of the window pane at an unpressurized condition based on the deflection, calculating a subsequent thickness of the window pane based at least on the reverse curvature of the window pane at the unpressurized condition, and evaluating a convergence between the initial thickness and the subsequent thickness.

If the convergence is not within a predetermined value, the method includes iteratively repeating the steps of defining a deflection of the window pane at a pressurized condition, defining a reverse curvature of the window pane at an unpressurized condition based on the deflection, and calculating a subsequent thickness of the window pane based at least on the reverse curvature.

It is contemplated that, when determining the initial thickness of the window pane, the method includes considering at least one of a maximum stress at the ultimate level, a maximum shear stress at an interlayer, a maximum stress around at least one fastener, a maximum stress at a limit level, and a fail-safe with an outer pane breached.

It is also contemplated that, when determining the subsequent thickness of the window pane, the method includes considering at least one of a maximum stress at the ultimate level, a maximum shear stress at an interlayer, a maximum stress around at least one fastener, a maximum stress at a limit level, and a fail-safe with an outer pane breached.

In the method of the present invention, the convergence is a value less than about 2%. Alternatively, the convergence is a value less than about 1%. Still further, it is contemplated that the convergence is a value less than about 0.5%.

The present invention also contemplates a window where the transparent pane defines a first surface configuration when not subjected to a pressure differential thereacross that is inconsistent with the outside mold line of the vehicle.

Still further aspects of the present invention will be made apparent from the discussion provided below.

BRIEF DESCRIPTION OF THE DRAWINGS

The present invention will now be described in connection with the drawings appended hereto, in which:

FIG. 1 is a cross-sectional schematic illustration of a portion of an interior of an aircraft according to the prior art, illustrating the window in an unpressurized condition;

FIG. 2 is a cross-sectional schematic illustration of a portion of an interior of an aircraft according to the prior art, illustrating the window in a pressurized condition;

FIG. 3 is a cross-sectional schematic illustration of a portion of an interior of an aircraft according to the present invention, illustrating the window in an unpressurized condition;

FIG. 4 is a cross-sectional schematic illustration of a portion of an interior of an aircraft according to the present invention, illustrating the window in a pressurized condition;

FIG. 12 provides selected information concerning stretched acrylic, one of the materials contemplated for the transparent pane of the window of the present invention;

DETAILED DESCRIPTION OF EMBODIMENT(S) OF THE INVENTION

Figure 5:
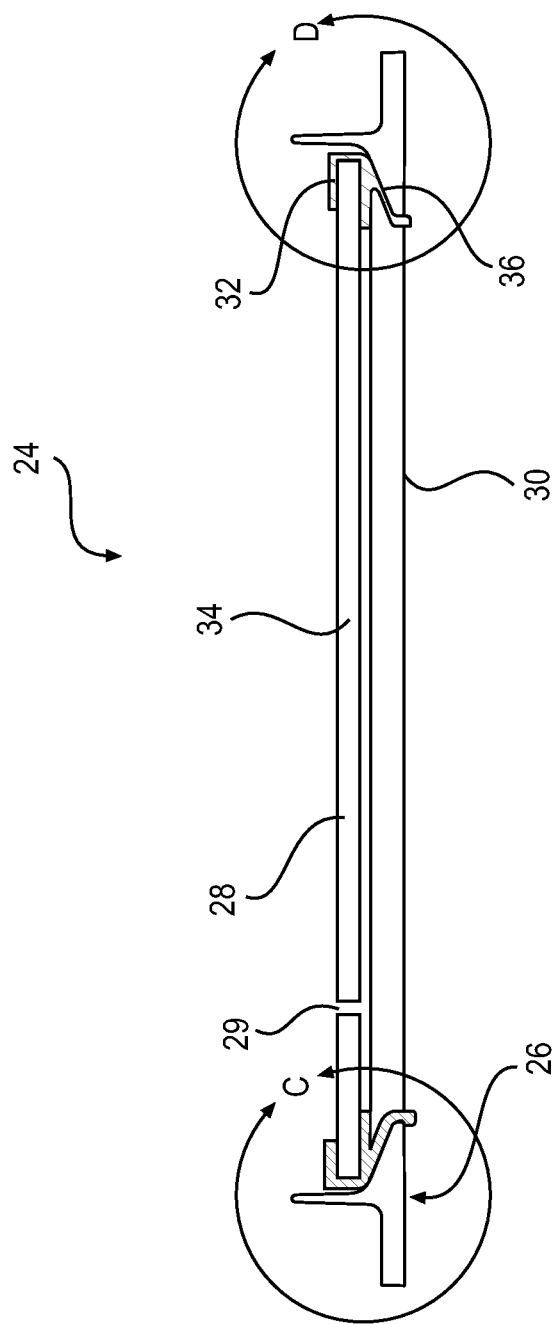
FIG. 5 is a cross-sectional illustration of a first embodiment of a window according to the present invention.

The present invention will now be described in connection with one or more contemplated embodiments. The embodiments that are described are intended to be exemplary of the present invention and not limiting of the scope thereof. In other words, while attention is focused on specific embodiments of the present invention, those embodiments are not intended to limit the present invention. To the contrary, the examples provided below are intended to illustrate the broad scope of the present invention.

While the window of the present invention is described in connection with its use in an aircraft fuselage, the present invention is not intended to be limited solely to aircraft. Other vehicles also may benefit from the engineering approach adopted to construct the window of the present invention. For example, the drag neutral window may be employed on a train or other high-speed vehicle.

In the discussion of the present invention that follows, specific materials will be listed for the construction of one or more components of the window. While a particular material may be discussed, the present invention is not intended to be limited to the materials that are described. To the contrary, it is envisioned that the window may be made from any suitable material (either now known or developed in the future) without departing from the scope of the present invention.

Before discussing details concerning specific embodiments of the present invention, the general approach to the designs for the window of the present invention is discussed.

As noted above, the window construction of the present invention does not seek to avoid or minimize the bulging of a window pane due to changes in the differential pressure applied thereto. Instead, the present invention provides a window that capitalizes on the bulging of the window by presenting one or more window designs that create a suitable aerodynamic surface after being subjected to a change in pressure consistent with altitudes commonly flown by modern aircraft at a cruising altitude. The change in pressure occurs as the aircraft gains altitude, resulting in a lower outside pressure while the cabin pressure is maintained at a certain pressure, equivalent, in one embodiment, to the air pressure at an altitude of 1,828.8 m (6,000 feet).

The present invention recognizes that a window constructed in accordance with the present invention will present a surface that is not aerodynamically ideal during the time period when the aircraft is ascending to or descending from a cruising altitude. However, given that aircraft spends a minority of its time in the transition from the ground to a cruising altitude, the present invention recognizes that a decrease in aerodynamic efficiency during these transitional periods will have a minimal effect on the overall fuel efficiency of the aircraft. As such, the present invention permits for aerodynamic inefficiency during the transition periods while the airplane is ascending to a cruising altitude or descending from a cruising altitude.

The present invention also recognizes that, by taking advantage of the flexion of the window at altitude, it is possible to construct a window with a lower weight by comparison with prior art windows. Specifically, by excluding structure and materials that the prior art incorporates into window designs to reduce flexion of the window panes, the design approach employed by the present invention permits the construction of a lighter weight window.

As noted above, any weight that is added to an aircraft diminishes (or reduces) the aircraft's overall fuel efficiency. Extra weight engenders additional fuel consumption during flight. Therefore, by employing the present invention, it is possible to reduce the overall weight of the aircraft and increase the fuel efficiency of that aircraft.

With the present invention, the weight savings might be potentially significant. Any decrease in aerodynamic efficiency during the transitional periods of take-off and landing is more than offset by increases in fuel efficiency overall by combining the effect of potential overall aircraft weight savings with improvement(s) in drag during cruising conditions.

As should also be apparent, by reducing the weight and complexity of the windows for an aircraft, it is possible to reduce the cost of each window. Accordingly, it is possible to lower the cost of manufacturing an aircraft by practicing the present invention.

Safety considerations for any window design are not only important for the design of any aircraft, but are also mandated by regulations promulgated by various aviation administrations and organizations worldwide. Despite a change in the design parameters for windows, the present invention is intended to meet or exceed various worldwide regulations that apply to aircraft construction.

Other factors that impact upon window design include, but are not limited to, acoustic and thermal properties associated with windows installed on aircraft. The window of the present invention is intended to meet these additional requirements.

By way of background, it is noted that an aircraft, when at altitude, typically experiences an external temperature close to −50° C. (−58° F.). The interior of the aircraft typically is maintained at a temperature of about 20° C. (68° F.). Any material selected for the window, therefore, should be capable of withstanding this temperature difference, $\Delta T$.

It is understood that the above-mentioned values may differ from those provided depending upon, for example, the inclusion of a heating system. It is contemplated, for example, that the windows may be heated, which would alter the temperature values discussed above. Specifically, if the windows are heated, the temperature difference might be greater than embodiments where the windows are not heated.

An increased temperature difference $\Delta T$ will affect behavioral characteristics of one or more of the components of the window of the present invention. For example, those skilled in the art would understand that heated windows are likely to have a negative impact on the drag properties of the aircraft. Specifically, when the materials from which the window is manufactured are heated, the materials will expand or change shape from the initial geometry. This expansion typically results in increased bulging of the windows, which further increases the drag penalty that the windows inflict on the aircraft.

Additionally, it is noted that most commercial aircraft fly at a height of between 12,800 m (42,000 feet) and 13,720 m (45,000 feet), as a general rule. For reference, passenger aircraft usually fly at the lower altitude, while business aircraft typically fly at the higher altitude.

With respect to the current state of the art, as noted above, some windows are designed to resist bulging during flight. As pointed out in connection with the '608 and '566 patents, the outer panes are designed to resist flexion or bulging by maintaining a static external surface. To achieve this objective, the materials used for the outermost pane are stiff and/or thick. As noted, the stiffness and/or thickness of the material are factors that contribute to the overall weight of the window.

While designed to resist flexion, it is acknowledged that exiting aircraft windows exhibit at least some minimal amount of bulging. The typical deflection of a window in an aircraft under operating conditions is assumed to be less than 0.2 inches (5 mm). The deflection is measured as the displacement of the window from the outside mold line of the aircraft. The outside mold line refers to the surface shape of the fuselage of the aircraft.

Figure 15:
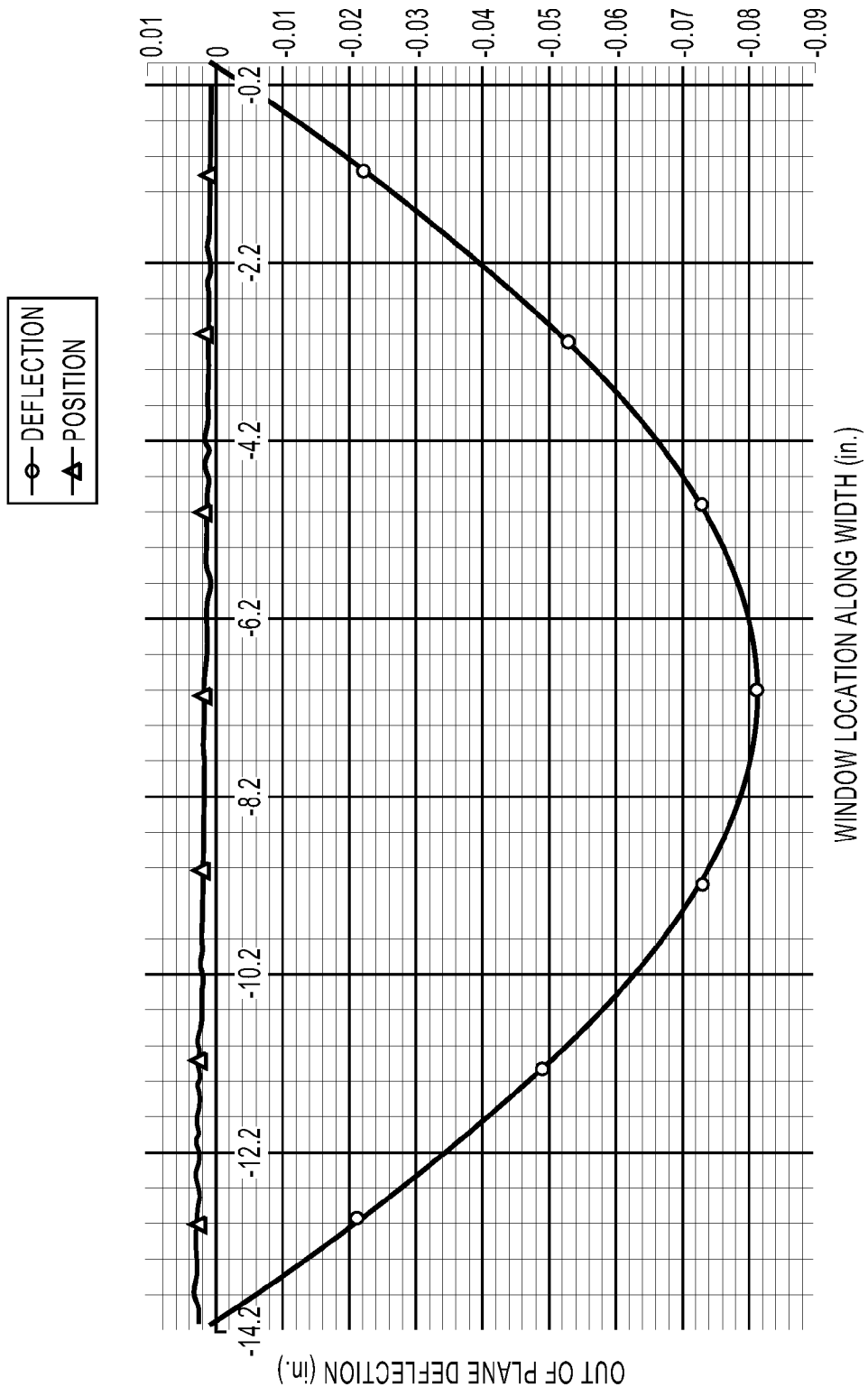
FIG. 15 is a graphical representation of the shapes of a planar window in both a pressurized and an unpressurized condition for a window according to the prior art.

FIGS. 1 and 2 are graphical schematics that represent the problem identified in the prior art that the present invention addresses. FIG. 15 also provides a graphical analysis of a window in the prior art, consistent with the illustrations in FIGS. 1 and 2. FIGS. 3 and 4 are graphical schematics illustrating the solution proposed by the present invention.

In each of FIGS. 1-4, the aircraft 10 is designated generally in cross-section. As should be apparent, only a portion of the aircraft fuselage 12 is shown for the aircraft 10. A portion of the floor 14 is illustrated as a reference. Windows 16, 18, 20, 22 also are shown in the fuselage. As should be apparent, the illustrations are from a vantage point within the aircraft 10, facing either a forward or an aft direction.

As should be apparent, FIGS. 1 and 2 are intended to illustrate the prior art. FIGS. 3 and 4 illustrate the basic principle underlying the present invention.

With reference to FIG. 1, which illustrates the prior art, the interior of the aircraft 10 is unpressurized, which is the condition when the aircraft 10 is on the ground, at an airport, for example. In this state, the window 16 conforms to the shape of the exterior surface 12 of the aircraft 10. In other words, in an unpressurized condition, the window 16 presents a curvature that is consistent with the curvature of the outside mold line of the aircraft 10. It is noted that the term "outside mold line" refers to the exterior surface of the body (or fuselage) of the aircraft 10.

FIG. 2 is a graphical illustration of the aircraft 10 shown in FIG. 1, also illustrating the prior art. Here, the aircraft cabin is pressurized, meaning that the aircraft 10 is in a cruising condition. The window 18 in this illustration exhibits an outwardly bulging curvature due to the pressurization of the cabin. As a result, the window 18 extends outwardly from the surface of the outside mold line 12, thereby negatively affecting the aerodynamic properties of the aircraft 10, as discussed above.

It is noted that some aircraft windows, such as the window described by the '718 application, will not exhibit any outward bulging. As noted above, the window described by the '718 patent includes cover pane 10 that is designed to maintain aerodynamic continuity regardless of the flight status of the aircraft. As noted, the cover pane 10 does not bulge and, therefore, maintains the aerodynamic continuity of aircraft regardless of the pressurization status of the cabin.

FIG. 3 illustrates an aircraft according to the present invention, which includes the window 20 of the present invention. In this illustration, the window 20 does not conform to the shape of the outside mold line 12, as in the case of the prior art window 16 when the cabin is not pressurized (i.e., when the aircraft 10 is on the ground). Instead, owing to the fact that the window will bulge outwardly when the aircraft 10 is at a cruising altitude, the window 20 is disposed inwardly from the surface of the outside mold line 12.

FIG. 4 illustrates the aircraft 10 including the window 22 of the present invention, when at a cruising altitude and the cabin is pressurized. As noted above, when the cabin is pressurized, the window 22 bulges outwardly due to the pressure within the cabin. The window 22 is designed so that the window conforms to the shape, at least partially, of the outside mold line 12 when the cabin is pressurized and the aircraft 10 is at a cruising altitude. As such, the window 22 helps to establish an aerodynamically acceptable configuration for the aircraft 10 when the aircraft 10 is at a cruising altitude.

With continued reference to FIG. 4, it is noted that the window 22 need not conform exactly to the outside mold line when the aircraft cabin is in the pressurized condition while the aircraft 10 is at a cruising altitude. The present invention contemplates that the window 22 may conform substantially or partially with the outside mold line of the aircraft 10. For example, in one embodiment, it is contemplated that the curvature of the window 22 will depart from the curvature of the outside mold line by 10% or less. In another embodiment, the departure is 5% or less. In still another embodiment, the departure is 2% or less. In a final contemplated embodiment, the departure is 1% or less.

In the context of the present invention, the window 22 is said to be substantially consistent with the outside mold line of the aircraft 10 when in the pressurized condition. As such, the window 20 is inconsistent with the outside mold line of the aircraft 10 when in the unpressurized condition. As noted above, the term "substantially consistent" refers to the condition where the window 22 closely matches the curvature of the fuselage 12 of the aircraft 10 (i.e., the outside mold line of the aircraft 10).

As should be apparent, this differs from the prior art where, inter alia, the window 16 is consistent with the outside mold line of the aircraft when in the unpressurized condition. The window 18, however, is inconsistent with the outside mold line of the aircraft 10 when in the pressurized condition. As should be apparent, the conditions of the window 16, 18 in the prior art are opposite to the conditions defined for the window 20, 22 of the present invention.

With reference to FIGS. 1-4, it is noted that the windows 16, 18 are intended to be the same window, in different states, due to the pressure of the cabin of the aircraft 10. Similarly, the windows 20, 22 are the same window, which also are shown in different states due to the pressure conditions within the cabin.

With reference to the aircraft 10 illustrated in FIGS. 1-4, the aircraft 10 may be a new aircraft that is specifically designed to receive the window 20, 22 of the present invention. Alternatively, however, the aircraft 10 may be an existing aircraft 10 that has been retrofitted to incorporate the window 20, 22 of the present invention.

With reference to FIG. 3, the window 20 is shown with an essentially planar shape. This depiction is intended to illustrate the change in the window 20, 22 from the unpressurized state (shown in FIG. 3) to the pressurized state (shown in FIG. 4). While the window 20 is shown with a planar shape, the window 20 is not intended to be limited to designs where the window 20 has only a planar shape when in an unpressurized state. To the contrary, it is contemplated that the window may have a curvature that is either concave or convex, with respect to a planar reference frame.

For example, it is contemplated that the window 20 will have a slightly positive curvature that is consistent with the positive curvature of the outside mold line 12 of the aircraft 10. When pressurized, the window 22 will then have an increased curvature (by comparison with the unpressurized state), which essentially conforms to the aerodynamic curvature of the outside mold line 12 of the aircraft 10 to produce a drag neutral or essentially drag neutral surface for the aircraft 10.

Similarly, it is contemplated that the window 20 may be provided with a slightly negative curvature. In this configuration, the window 20 would bulge inwardly into the cabin of the aircraft 10 when the cabin is in the unpressurized condition. The window 20 would bulge outwardly to establish a drag neutral surface for the aircraft 10 when the aircraft 10 is at a cruising altitude.

It is also contemplated that the window 20 may include a combination of regions of negative curvature, regions of positive curvature, and regions without curvature, when the window 20 is in an unpressurized state. This configuration is contemplated to be less desirable than other configurations, because the variable curvatures are likely to produce a ripple effect, visually, when the cabin of the aircraft 10 is an unpressurized state. Such an effect may have an undesirable impact on the optical qualities of the window 20 when in an unpressurized condition.

It is contemplated that the window 20, 22 of the present invention may be made from any material or include any type of construction without departing from the broadest aspect of the present invention. With this in mind, specific contemplated embodiments of the present invention are discussed below. These contemplated embodiments are not intended to limit the scope of the present invention. As indicated above, they are intended to illustrate the wide applicability of the present invention to aircraft 10 and other vehicles.

It is noted that the structural elements for the window of the present invention and the manner in which the window is attached to the aircraft 10 are intended to incorporate materials and elements from the prior art. Specifically, in several embodiments, it is contemplated that the window of the present invention will rely on the parts used in existing windows. As such, it is contemplated that the window of the present invention may be retrofitted onto existing aircraft without considerable cost or retooling.

FIG. 5 is a cross-sectional side view of a window 24 according to the present invention. This window 24 design includes a frame 26, an inner pane 28, an outer pane 30 and a seal 32 surrounding the panes 28, 30 and being positioned between the panes 28, 30 and the frame 26. The panes 28, 30 are separated from one another by an air gap 34.

In one contemplated embodiment, which is illustrated in FIG. 5, the inner pane 28 includes a hole 29, which allows air pressure to equalize between the cabin and the air gap 34. As a result, in this embodiment, only the outer pane 30 carries the load associated with the air pressure. Therefore, only the outer pane 30 bulges outwardly in response to the air pressure. As should be apparent, in this embodiment, the inner pane 28 is not subjected to a differential pressure and, as a result, does not bulge in response thereto.

In one embodiment, it is contemplated that the outer pane 30 will be made from the same material as the inner pane 28.

It is contemplated that the seal 32 will be made from an elastomeric material, such as rubber. The frame 26 is contemplated to be made from an aluminum alloy, metallic alloy, or composite material, among other possibilities. As illustrated, the outer pane 30 includes a beveled edge 36, which conforms to the frame 26, so that the outer pane 30 accommodated the thickness of the fuselage 12.

Figure 6:
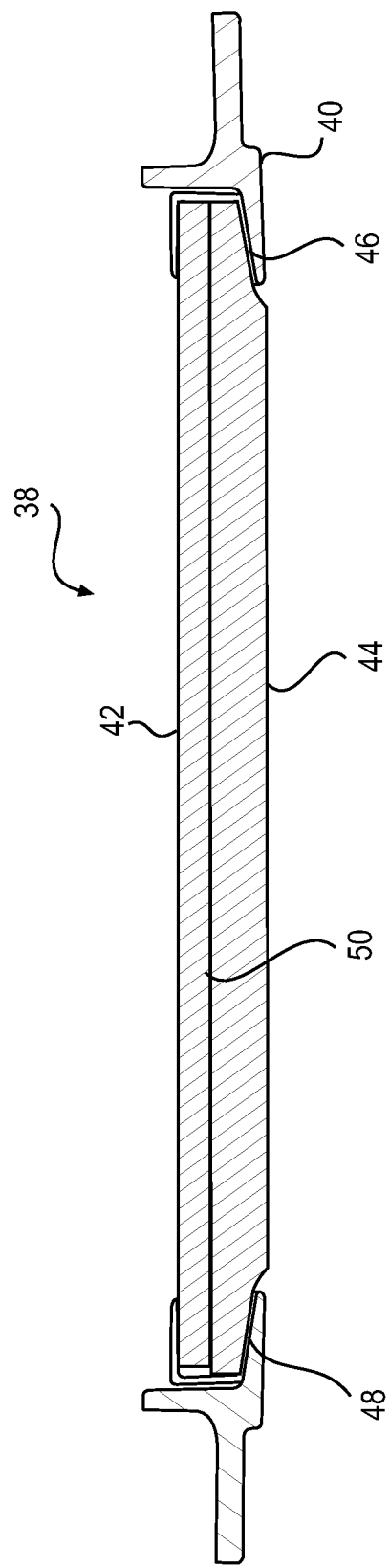
FIG. 6 is a cross-sectional illustration of a second embodiment of a window according to the present invention.

FIG. 6 is a cross-sectional side view of another window 38 according to the present invention. In this embodiment, the window 38 includes a frame 40, an inner pane 42, an outer pane 44, and a seal 46. As with the prior window 24, the frame 40 is made from an aluminum material and the seal 46 is made from rubber. The outer pane 44 includes a beveled edge 48, which conforms to the frame 40 so that the outer pane 44 accommodates the thickness of the fuselage 12.

In this second window 38, there is no air gap 34. Instead, the inner pane 42 and the outer pane 44 are separated by an interlayer 50, which is contemplated to be made of a urethane material (in one embodiment). It is anticipated that the interlayer 50 will be connected to the inner pane 42 and the outer pane 44 to form a laminate structure. For this reason, the window 38 is referred to as a laminate window 38. For the window 38, the inner pane 42 serves as the redundant pane to contain the cabin pressure should the outer pane 44 fail during flight, for example.

Figure 7:
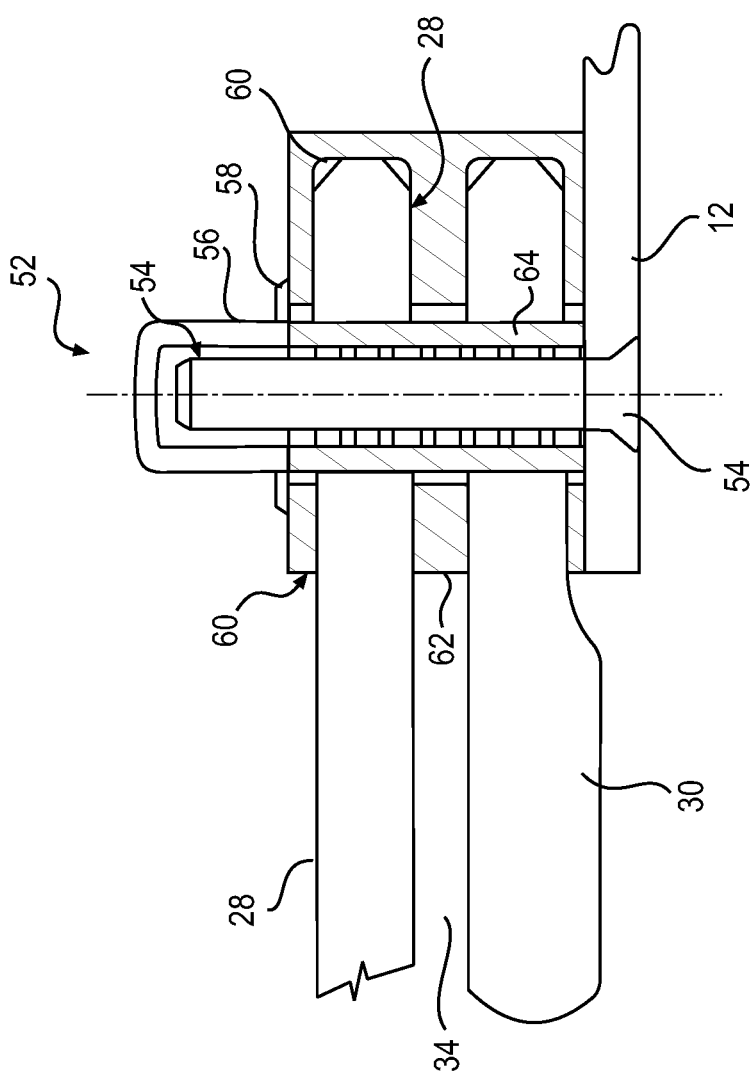
FIG. 7 is a cross-sectional illustration of a first embodiment of a fastener system used to connect a window to a fuselage of an aircraft.
Figure 8:
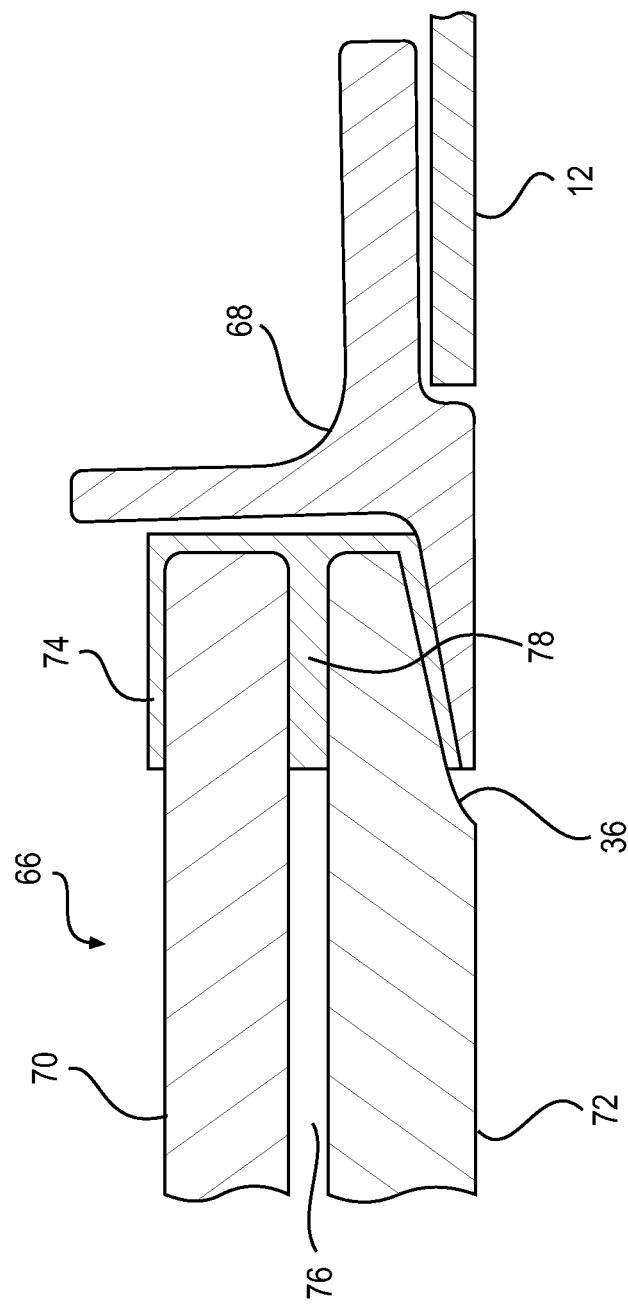
FIG. 8 is a cross-sectional illustration of a second embodiment of a fastener system used to connect a window to a fuselage of an aircraft.

When considering either of the windows 24, 38, the manner in which the windows 24, 38 are connected to the fuselage 12 is a consideration when considering window design and construction. There are two concepts associated with the connection of the window 24, 38 to the fuselage. The first is the bolted concept, which is illustrated in FIG. 7. The second is the plug concept, which is illustrated in FIG. 8.

FIG. 7 is a cross-sectional side view of a bolted fastener system 52 according the present invention. As noted above, the bolted fastener system 52 is one means by which a window 24, 38 may be attached to a frame element or directly to the fuselage 12 of an aircraft 10.

In the embodiment illustrated in FIG. 7, the panes 28, 30 are connected to the fuselage 12 without an intermediate frame. As such, the frame for the window 24 is the portion of the fuselage 12 that is immediately adjacent to the pane 28, 30. In other words, for this embodiment, the fuselage 12 also functions as the frame for the window 24.

In an alternative construction, the panes 28, 30 are connected to a separate frame, such as an aluminum ring, that is, in turn, connected to the fuselage 12. Other variations also are considered to fall within the scope of the present invention.

The bolted fastener system 52 includes a plurality of bolts 54 that extend through the fuselage 12 and connect to nuts 56 on the interior of the aircraft 10. Each nut 56 includes an annular flange 58 (or washer) that provides a compressive force to the seal 60.

The seal 60 is a member that surrounds both the inner pane 28 and the outer pane 30 at the outer edges of the two panes 28, 30. The seal includes an intermediate section 62 that is disposed between the panes 28, 30 and helps to establish the air gap 34. As should be apparent from FIG. 7, the window 24 depicted is an air gap type window, as discussed in connection with FIG. 5.

While the bolted fastener system 52 is illustrated in connection with an air gap window 24, the same fastener system 52 also may be employed in connection with the laminate window 38. As should be apparent, when employed with a laminate window 38, the seal will have a different cross-section, since an intermediate section 62 is not required.

It is contemplated that the seal 60 will extend into the holes 64 in the window panes 28, 30. This permits the seal 60 to absorb any in-plane deformations of the window 24 due to thermal, pressurization, and/or mechanical forces acting on the window 24. Mechanical stresses include, but are not limited to, torsion and/or bending of the fuselage 12, as should be apparent to those skilled in the art.

FIG. 8 is a cross-sectional illustration of a plugged fastener system 66 according to the present invention with retention clips removed for clarity. The plugged fastener system 66 includes a frame 68, an inner pane 70, and outer pane 72, and a seal 74. The window 24 includes an air gap 76, as previously described. The seal 74 surrounds the inner pane 70 and the outer pane 72. The seal 74 also includes an intermediate section 78 that extends between the inner pane 70 and the outer pane 72 to help establish the air gap 76.

The frame 68 is contemplated to be manufactured as a forged element of the window 24. As before, the frame is contemplated to be made from aluminum or an alloy of aluminum. As a forged element, the frame 68 exhibits higher material strength than a frame 68 that is machined, for example. Forged frames 68 also are less expensive to produce, as should be apparent to those skilled in the art, because they do not require machining. As should be apparent to those skilled in the art, however, the frame 68 may be made according to any alternative method of manufacture without departing from the scope of the present invention.

Additionally, it is contemplated that the frame 68 may be made from an alternative material, such as a composite material. Composite materials combine fibers, either woven or unwoven, suspended in a matrix. A typical example is a carbon fiber incorporated into a resin matrix. As should be apparent to those skilled in the art, there are numerous possible composite materials that may be employed without departing from the scope of the present invention.

Figure 9:
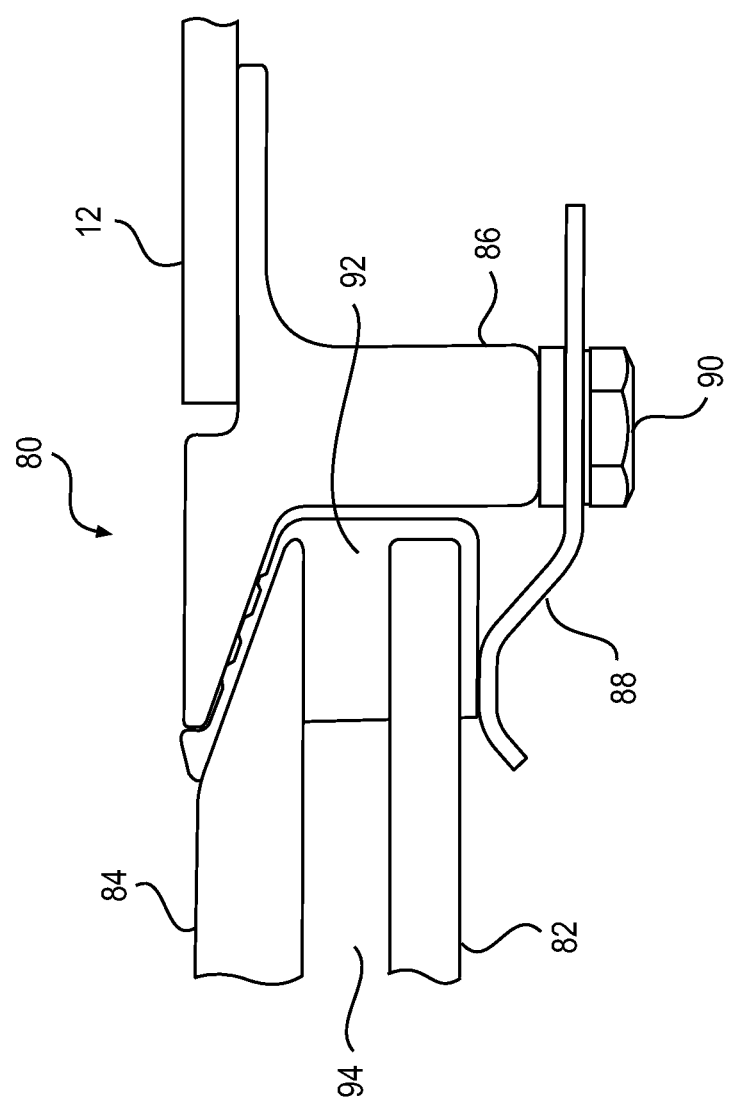
FIG. 9 is a cross-sectional illustration of a third embodiment of a fastener system used to connect a window to a fuselage of an aircraft.

With reference to FIG. 9, which illustrates one embodiment of a plugged fastener system 80 contemplated for use with the present invention, the inner and outer panes 82, 84 are affixed to the frame 86 via clips 88. The clips 88 are affixed to the frame 86 via bolts 90. Since the window depicted is an air gap window 24, the seal 92 is shaped to establish and maintain the air gap 94 between the panes 82, 84.

Figure 10:
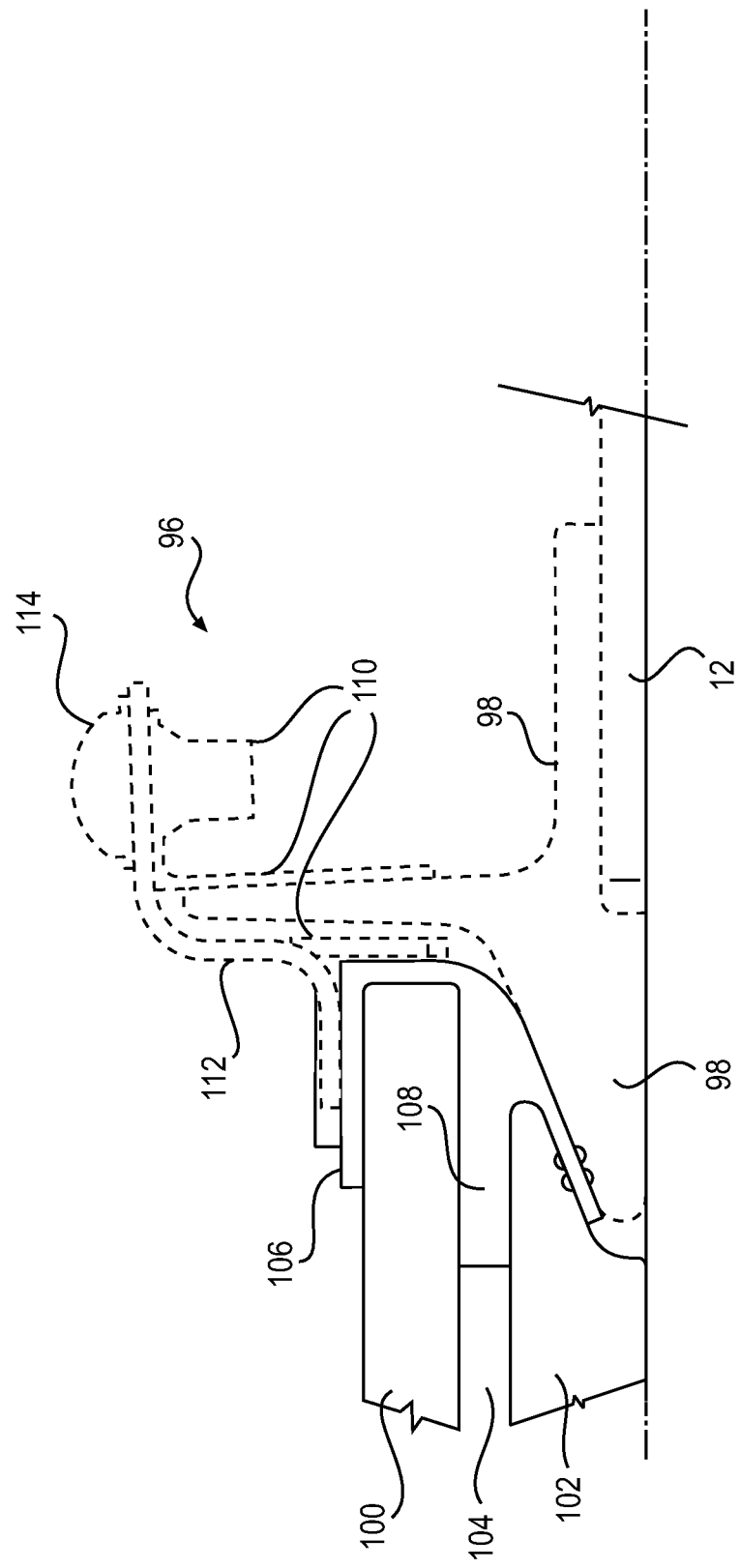
FIG. 10 is a cross-sectional illustration of a fourth embodiment of a fastener system used to connect a window to a fuselage of an aircraft.

FIG. 10 illustrates still another embodiment of a plugged fastener system 96 that includes a frame 98 having an inner pane 100 and an outer pane 102 separated by an air gap 104. A seal 106 surrounds the panes 100, 102 and includes an intermediate portion 108 between the panes 100, 102. A clip 110 holds the panes 100, 102 in the frame 98. The clip 110 includes a leg portion 112 and a bolt 114 (or other suitable fastener) to secure the panes 100, 102 in the frame 98.

The clip 110 maintains the panes 100, 102 in position under normal operating conditions, such as when the cabin pressure is higher than the air pressure in the exterior environment. Additionally, the clip 110 maintains the panes 100, 102 in position under conditions where the exterior pressure is higher than the cabin pressure. This condition might occur during a rapid descent of the aircraft.

When sizing a window 24, 38, there are a number of general considerations that underlie the selection of various design parameters. For example, it is assumed that the window 24, 38 does not absorb mechanical stresses from the fuselage 12 during operation of the aircraft 10. As such, in the case of the air gap window 24, the panes 28, 30 are permitted to move within the seal 32, 60. For the bolted fastener system 52, this means that the inner and outer panes 28, 30 includes holes 64 that permit the panes 28, 30 to move with respect to the bolts 54. This also leads to the incorporation of the seal 60, in the form of flexible bushings, within the holes 64, as illustrated. In the plugged fastener system 80, the panes 82, 84 are permitted to slide against the frame 86 and clip 88. As should be apparent with this construction, the panes 28, 30 are able to move with respect to (or around) the bolts 54. Accordingly, at least some of the load created by the mechanical stresses from the fuselage 12 is absorbed by the seal material 60 within the holes 64 that surrounds the bolts 54.

As an example of one design parameter underling the present invention, it is assumed that the pressure differential $\Delta P$ between the interior and exterior of the aircraft 10 is about 10 psi (68.95 kPa)±2 psi (13.79 kPa). As a result, designers choose to conservatively account for a pressure differential of two times this value (2×) for commercial jet aircraft or two and a half times this value (2.5×) for business and personal aircraft. The difference in design parameters is due to the difference in altitudes at which the two type of aircraft cruise, as identified above.

As noted above, it is contemplated that the deflection of the window 18 is less than 0.2 in. (5 mm) between the unpressurized and the pressurized states. Thus, deflection of prior art widows 18 has been evaluated as a part of the considerations underlying the present invention. As noted above, and as discussed in greater detail below, when the window 18 is in the unpressurized state, the window 18 conforms to the outside mold line of the aircraft 10. The 0.2 inch (5 mm) deflection, therefore, reflects a positive displacement with respect to the outside mold line of the aircraft 10.

As also discussed above, for the air gap window 24, the outer pane 30 is subjected to the forces generated by the pressure differential $\Delta P$. It is assumed that the pressure in the air gap 34 is the same as the pressure in the cabin, but this is not required to practice the present invention. For the laminated window 38, the inner pane 42, the outer pane 40, and the interlayer 50 are subjected to the forces generated by the pressure differential $\Delta P$.

For the plugged fastener system 66, the maximum stress due to the pressure differential ΔP occurs at the center of the panes that comprise the window 24, 38. For the plugged fastener system 66, there are no bolts 54 to restrain the inward movement of the panes 42, 44. As such, stresses are not concentrated at the edges of the window 24, 38.

The material employed for the window panes 28, 30, 42, 44 is contemplated to be stretched acrylic. As noted below, other materials may be employed without departing from the scope of the present invention.

When designing aircraft windows 24, 38, one parameter of interest is crazing. Crazing refers to cracks or scratches that appear over a period of time or appear after an understood number of load cycles where the material is subjected to its limit load. Crazing stress is a property that depends upon the material. For example, crazing is frequently associated with polymeric materials, such as stretched acrylic, the material forming the window panes 28, 30, 42, 44. Crazing stress is not a property associate with all materials. For example, crazing typically is not associated with glass.

Crazing stress differs from the ultimate load. Crazing encompasses the cracks or scratches that are present on the window pane 28, 30, 42, 44 on a microscopic level (also referred to as "microscratches"). Crazing stress typically is measured in units of ksi (or kilopounds of pressure per square inch). 1 ksi equals 1,000 psi or 6,894.76 kPa. For purposes of the present invention, crazing is limited to 2.5 ksi (or 13,789.52 kPa). The maximum stress applied to the window is limited to 11 ksi (or 75,842.36 kPa), as a limit to the stress applied to the material from which the panes 28, 30, 42, 44 are manufactured.

As discussed above, windows 24, 38 that are manufactured using the bolted fastener system 52 function in a different way from windows 24, 38 that rely on the plugged fastener system 66.

The inner and outer panes 42, 44 also will exhibit an out-of-plane deformation as the inner and outer panes 42, 44 bulge outwardly when subjected to the pressure differential ΔP. The stiffness of the material that comprises the seal 46 will affect the out-of-plane displacement of the inner and outer panes 42, 44. The stiffness of the material is a function of the properties of the material itself and of the thickness of the material. As may be appreciated by those skilled in the art, the stiffer or the thicker the material used for the seal 46, the less the panes 42, 44 are able to deflect from its initial position with respect to the out-of-plane pane deformation.

For the bolted fastener system 52, the thickness of the outer shell or fuselage 12 (which is also referred to as the "skin thickness") also must be taken into consideration. Skin thickness and pane thickness are not independent variables when designing a window according to the present invention. To the contrary, skin thickness affects pane thickness. Specifically, the greater the skin thickness, the thinner the pane thickness and vice versa. In other words, the pane may be thinner when the skin is thicker.

As a part of the present invention, a methodology is established for determining the size of the window 24, 38 and the expected out-of-plane displacement when subjected to a differential pressure ΔP at a cruising altitude.

In the methodology of the present invention, there are a number of considerations that are taken into account with respect to the mounting (i.e., a bolted fastener system 52 or a plugged fastener system 66). A first variable includes an evaluation of the mounting conditions for the window 24, 38 as well as climatic conditions. A second variable concerns the deflection of the panes 28, 30, 42, 44 when subjected to the differential pressure ΔP. Any deflection of the mounting structure (i.e., the bolted fastener system 52 or the plugged fastener system 66) as a result of deflection of the skin 12 also is taken into account. Third, differential contraction and expansion between the panes 28, 30 and the mountings (i.e., the bolted fastener system 52 or the plugged fastener system 66) are relevant factors. A fourth variable is the deflection of the panel (hereinafter "Δh") resulting from a temperature gradient across the thickness of the panel 28, 30, 42, 44. A fifth factor is long term deformation, such as creep, particularly of the non-metallic elements.

With respect to the term "variable," it is noted that some design parameters are considered constants under certain circumstances. For example, the radius of the fuselage 12 of the aircraft 10 is a "variable" in the sense that the radius may be changed. However, when considering a particular aircraft with a particular fuselage radius, this parameter is fixed at a predetermined value and, therefore, may be treated as a constant (or a constraint) in calculations performed with respect thereto.

With this in mind, the method 120 of the present invention may be characterized as accommodating the following variables: (1) window height, (2) window width, (3) window corner radius, (4) attachment type (i.e., either plugged or bolted), (5) the forging thickness of the frame, if the plugged system is employed, and (6) the skin thickness of the aircraft, if the bolted system of attachment is employed.

With these factors being identified as variables available for the method 120 of the present invention, there are a number of constraints placed upon that method 120. "Constraints" are fixed values that are not altered, manipulated, or changed with respect to the method 120 of the present invention. The constraints include, but are not limited to: (1) the fuselage radius, (2) the pressure used (such as the pressure in the cabin at cruising altitude), (3) the window type (i.e., air gap or laminated), (4) the type of material used for the window panes, and (5) the maximum stress that may be borne by the pane and/or the interlayer.

The method of sizing a window for a drag neutral configuration encompasses a number of steps and takes into account several variables and/or constraints.

Figure 11:
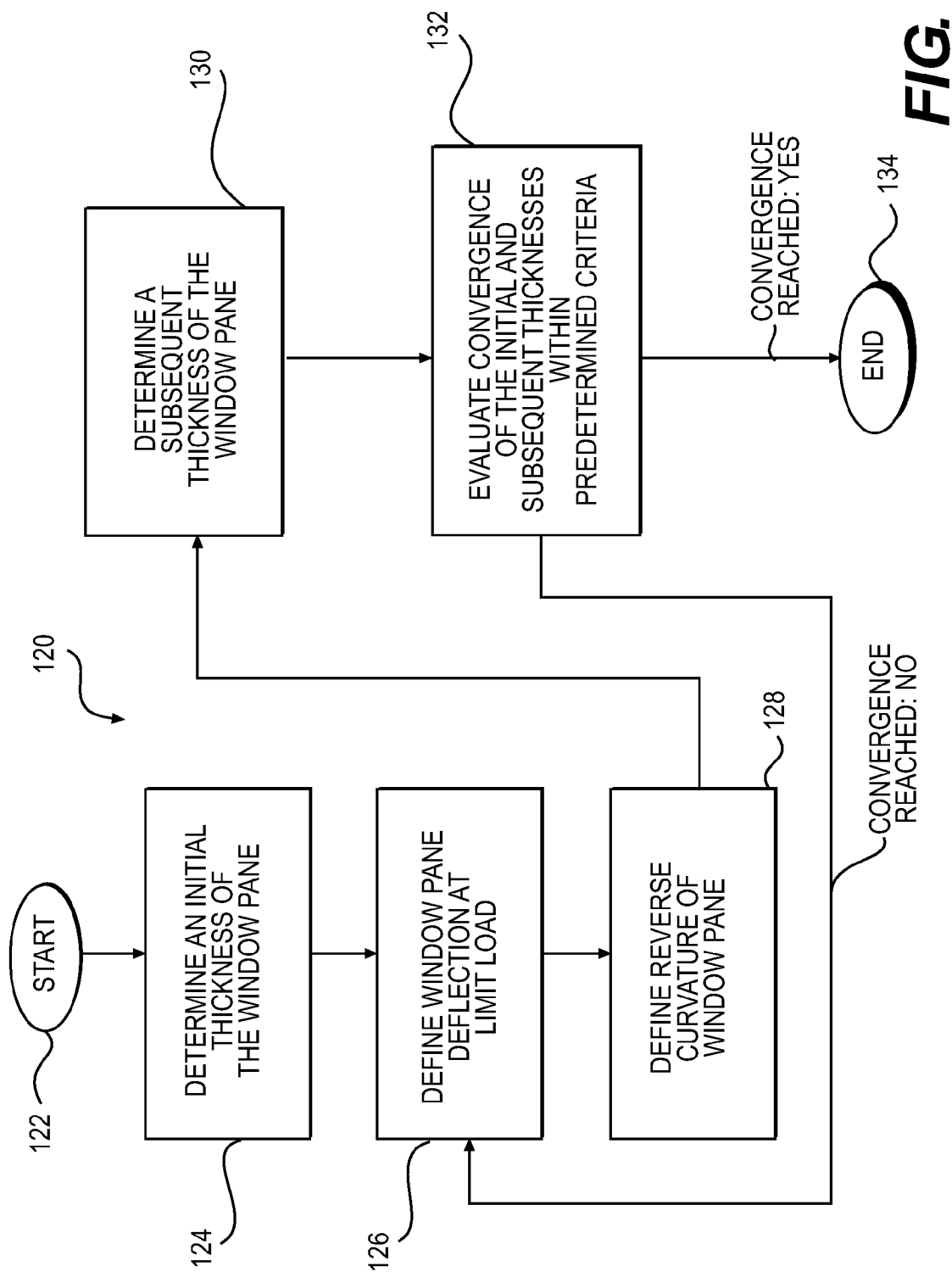
FIG. 11 is a graphical illustration of one method contemplated for configuring a window for an aircraft.

The method is illustrated in FIG. 11 and is designated 120.

The method 120 begins at step 122.

The method 120 proceeds to step 124 where an initial window pane thickness is determined. As should be apparent, the window pane to which the method 120 is applied is contemplated to be the exterior window pane 30 for the air gap window 24. For the laminate window 38, the window pane to which the method 120 is applied is the composite of the inner pane 42, the outer pane 44, and the interlayer 50. As also should be apparent from the foregoing, the method 120 may be applied to any of the window embodiments that are discussed herein and their equivalents.

The determination of the initial window pane thickness at step 124 is anticipated to be performed via a finite element analysis. However, other analytical tools may be employed without departing from the scope of the invention, as should be apparent to those skilled in the art. Therefore, reference to a finite element analysis is not intended to be limiting of the method 120 of the present invention. Moreover, the analysis may be linear or non-linear, depending upon the approach taken.

With respect to the finite element analysis on the window pane, it is assumed that the surrounding structure (i.e., the material that defines the skin of the aircraft) is an infinitely rigid (or stiff) structure. In other words, the method 120 of the present invention assumes that the skin of the aircraft is inflexible and perfectly rigid. While this assumption accurately characterizes the skin of the aircraft, it is contemplated that the structural properties of the skin of the aircraft may be taken into account.

In step 124, when determining the thickness of the window pane, one or more of several variables and/or constraints may be taken into account.

The first factor is the maximum stress that may be applied to the window pane at the ultimate level. As noted above, this may be characterized as a constraint, since this is presumed to be an unchanging number after the material for the window pane has been selected. As should be apparent to those skilled in the art, the maximum stress that may be applied to the window defines the maximum boundary conditions for the window constructed according to the present invention.

The second factor is the maximum shear stress at the interlayer. As noted above, this factor also may be considered as a constraint, because this factor does not change once the material for the interlayer is selected. As should be apparent, this second factor is considered when designing a window with a laminated window pane construction.

The third factor is the maximum stress around the fasteners that connect the window to the skin of the aircraft. This third factor is taken into account when designing a window with a bolted fastener system, such as the bolted fastener system 52. This third factor also may be considered as a constraint once the materials for the window are selected.

The fourth factor is the maximum stress at the limit level, which provides a comparison with the crazing stress limitation. Again, as a maximum stress, this factor may be considered as a constraint, since it also is dependent upon the materials selected for the construction of the window.

The fifth factor is a fail-safe evaluation with the outer pane broken or breached. In this instance, the fail-safe applies to the inner pane, as discussed in detail above. Specifically, the inner pane is designed to be the fail safe for the window. As before, this factor also may be considered to be a constraint, because the fail-safe parameters are dependent upon the material that is selected for the window.

As noted above, variables that may be taken into account include, but are not limited to: (1) window height, (2) window width, (3) window corner radius, (4) attachment type (i.e., either plugged or bolted), (5) the forging thickness of the frame, if the plugged system is employed, and (6) the skin thickness of the aircraft, if the bolted system of attachment is employed. As also noted above, constraints that may be taken into account include, but are not limited to: (1) the fuselage radius, (2) the pressure used (such as the pressure in the cabin at cruising altitude), (3) the window type (i.e., air gap or laminated), (4) the type of material used for the window panes, and (5) the maximum stress that may be borne by the pane and/or the interlayer.

Having taken one or more of these factors, variables, and/or constraints into account, it becomes possible to apply a finite element analysis to the window and calculate the initial window pane thickness.

Once the initial window pane thickness is calculated, the method 120 proceeds to step 126. At step 126, the pane deflection at the limit load is defined for the window pane thickness calculated in step 124. The limit load is the pressure differential $\Delta P$ that is anticipated to be applied to the window pane when the aircraft is at a cruising altitude (i.e., the pressurized condition). By applying the limit load to the window pane at the initial thickness determined in step 124, it becomes possible to calculate the deflection of the window pane at the cruising altitude.

The method 120 then proceeds to step 128, where the reverse curvature of the pane is determined. Specifically, after evaluating the deflection of the window pane at the limit load in step 126, the window pane is evaluated in the unpressurized condition, as would exist when the aircraft is on the ground. Therefore, the method 120 first calculates the deflection at the limit load in step 124 and then calculates the reverse curvature in step 126 based on the determination of the deflection condition of the window pane.

In step 128, it is contemplated that an analysis may be conducted separately to evaluate the maximum allowed deflection of the window pane for the lightest weight window. The weight of the window may then be compared to the drag penalty that is generated by the window when at the maximum deflection.

As noted above, it is an objective of the method 120 of the present invention to balance the weight of the window against the drag penalty created by the window so that the lightest window may be designed that generates a minimal drag penalty for the aircraft. Specifically, it is an objective of the method 120 of the present invention to minimize the out of plane displacement of the window. This minimizes the drag penalty created by the window, since the drag penalty is a function of the out of plane displacement of the window. Also, the method 120 of the present invention is provided to minimize the weight of the window. By balancing the out of plane displacement and the weight of the window, it is possible to design a window that minimizes drag and also minimizes the negative effects that weight has on the performance of the aircraft.

The method 120 then proceeds to step 130, where a second finite element analysis is applied to the window pane to determine a subsequent thickness. As before, this subsequent finite analysis is not intended to be limiting of the present invention. Other analysis methodologies may be applied without departing from the scope of the present invention.

At step 130, the reverse curvature shape calculated in step 128 is used to calculate the deflection of the window pane at the limit load. This step differs from the initial finite analysis of step 124 in that the input to this step is the reverse curvature calculated at step 128. In the initial finite analysis step 124, the inputted variables include one or more of the five variables discussed above. In this second analysis step 128, one or more of the five variables discussed above also may be considered.

Effectively, the subsequent finite element analysis in step 130 is a check on the calculation of the thickness at step 124. After determining the thickness of the window at step 130, it becomes possible to compare the thickness results from step 130 with the thickness result from step 124. Ideally, the values should be identical. If so, there is 100% convergence. It is expected, however, that there will not be complete convergence and that there will be some deviation between the two values.

The method then proceeds to step 132, where convergence of the calculations is evaluated. If the convergence exhibits less than a deviation of 2%, then there is greater than a 98% convergence between the calculated thicknesses at the limit load. It is contemplated that less than a 2% deviation between the values will be acceptable in most instances. In other variations, the deviation may be selected as being less than 1%. In still another variation, the deviation may be less than 0.5%. For the method 120, the deviation may be set at any predetermined value that is considered acceptable for the window being evaluated.

If the deviation is less than 2% (or the predetermined value), it is said (for purposes of the method 120) that convergence has been reached. If convergence meets the predetermined criteria, the method 120 proceeds to step 134, where the method 120 ends.

If the deviation is greater than 2% (or the predetermined value), it is said that convergence has not been reached. If there is no convergence, the method 120 returns from step 132 to step 126. Steps 126, 128, and 130 are then repeated in an iterative manner until convergence is reached.

As also should be appreciated, there is an expectation that there will be consistency between iterations of steps 126, 128, and 130. The consistency is contemplated to follow the deviation guidelines set forth above.

As noted above, in the method 120, fatigue and crazing stresses are taken into account, as discussed above, for the panes 28, 30, 42, 44. One way to reduce the occurrence of fatigue and stress crazing is by limiting the maximum working stress level over the complete window assembly 24, 38, allowing for expected service deterioration from weathering, minor damage, environmental attack, and/or the use of chemicals and cleaning fluids.

Limiting the effects of these service deterioration factors includes consideration of one or more of four factors. The first factor is the strength of the polymer (or other material), as reported by the manufacturer under sustained loading, from which the panes 28, 30 42, 44 are constructed. The second factor includes the normal working temperature for the panes 28, 30, 42, 44, which accommodates for any heating systems that may be employed in connection therewith. The third factor is the ambient temperature on the outside of the panes 28, 30, 42, 44 and the temperature outside of the aircraft 10. The fourth factor is the load factor to be applied to the material from which the panes 28, 30, 42, 44 are constructed. For glass, the load factor is 2.0. For stretched acrylic, the load factor is 2.0. For cast acrylic, the load factor is 4.0. Finally, for polycarbonate, the load factor is 4.0. The load factor is based on regulatory requirements.

Selected properties associated with one stretched acrylic material (MIL-P-25690A) is provided in FIG. 12. As should be apparent from the foregoing, other materials may be used (such as glass or polycarbonate) without departing from the scope of the present invention.

It is noted that the windows 24, 38 of the present invention may be installed in any type of aircraft 10. Moreover, the windows 24, 38 are not limited to aircraft with a fuselage 12 made from an aluminum alloy. It is contemplated that the windows 24, 38 of the present invention may be employed in aircraft 10 with a fuselage made from a composite material without departing from the scope of the present invention.

When designing an aircraft 10, the size, location, shape, thickness, material, and pitch of the windows 24, 38 are taken into account. As noted above, the deflection of the windows 24, 38 when under pressure is a measurable and quantifiable variable. The deflection distance $\Delta h$ is measured as the difference between the distance of the window 24, 38 from the outside mold line in the unpressurized state $h_1$ to the distance of the window 24, 38 from the outside mold line in the pressurized state $h_2$. Therefore, the deflection distance $\Delta h$ may be represented by the following equation:

$$\Delta h = h_2 - h_1 \quad (1)$$

As a matter of definition, a position, h, with zero deflection is consistent with the outside mold line of the aircraft 10. If the window 24, 38 is positioned inside of the outside mold line (i.e., a reverse curvature) the deflection position is represented with a positive value. If the window 24, 38 has a position, h, that is outside of the outside mold line (i.e., a positive curvature (or bulge)), the deflection position is represented with a negative value.

As a general rule, the deflection distance $\Delta h$ of the windows 24, 38 is designed to lie between 0.1 and 1.0 inches (2.5-25 mm). However, a smaller or larger amount of deflection may be designed into the materials that comprise the windows 24, 38, as should be apparent to those skilled in the art.

In one embodiment of the present invention, the window 24, 38 is contemplated to be made from the same materials as windows in the prior art. As such, it is contemplated that the windows 28, 34 will exhibit the same deflection distance $\Delta h$ as windows in the prior art. However, with respect to the present invention, the windows 24, 38 have a negative deflection position $h_1$ when in the unpressurized state. The windows 24, 38 may then have a neutral ($h_2=0$) or a slightly positive ($h_2>0$) displacement when the aircraft 10 is pressurized.

Figure 13:
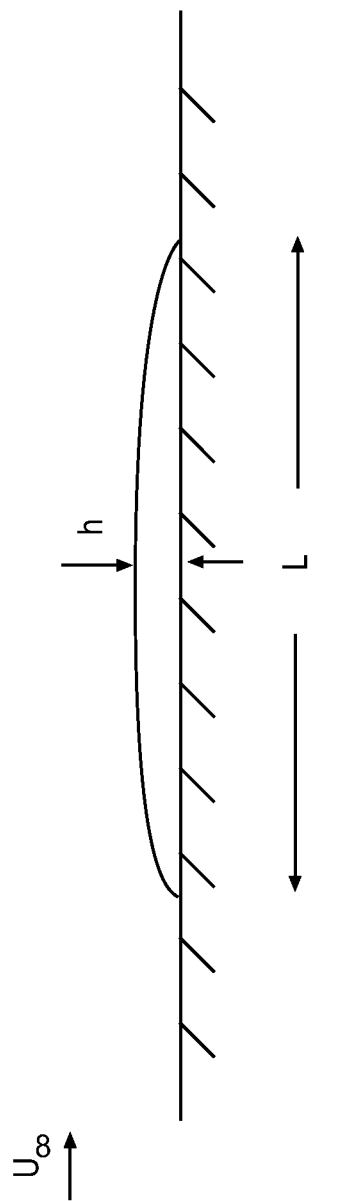
FIG. 13 is a pictorial illustration depicting one equation and a selected number of variables that may be employed in connection with the present invention.

FIG. 13 pictorially illustrates one example of the type of calculations that may be employed as a part of the method 120 of the present invention.

FIG. 13 provides a pictorial and mathematical overview of some of the parameters associated with the window of the present invention. The variable "h" refers to the distance (also referred to herein as $\Delta h$) that the window moves (i.e., its out-of-plane deflection) when subjected to a differential pressure $\Delta P$. The variable "L" indicates a length or lateral size of the window of the present invention. The variable $C_D$ refers to the coefficient of drag. The variable "q" is a correlation coefficient. This equation is understood to provide for a target displacement determination when a perfect drag neutral configuration is not achieved.

As noted above, aircraft designers traditionally have been reluctant to incorporate larger windows in aircraft. One reason for this has been a reluctance to add weight to the aircraft. As noted above, the larger the window area (i.e., the larger the pane size), the heavier the window. One reason for this has been the inclusion of thicker panes in the windows to minimize outward deformation. Another reason for the increased weight has been the addition of an exterior pane to windows that cannot be deformed.

Figure 14:
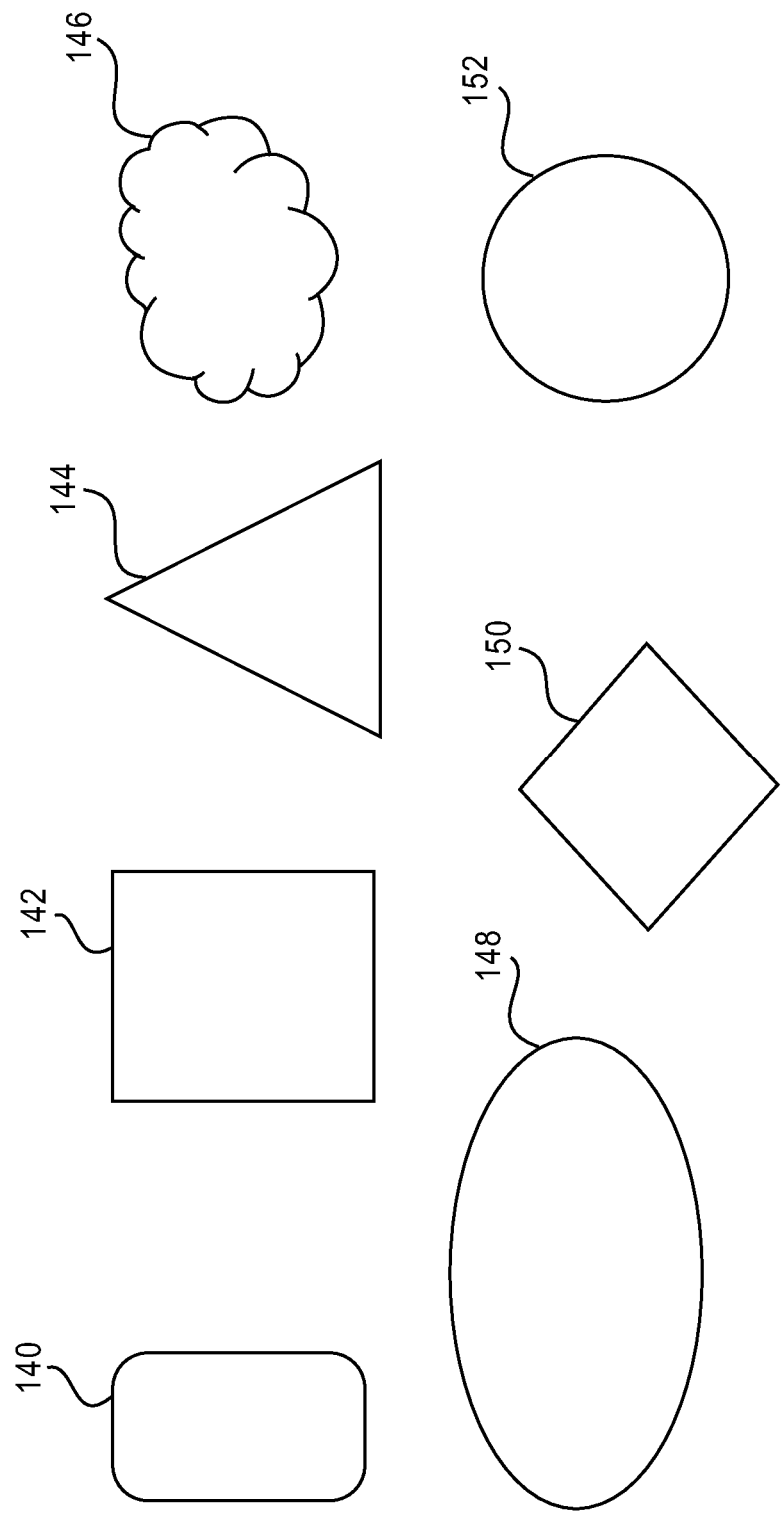
FIG. 14 provides a graphical representation of a number of different window shapes that are contemplated by the present invention.

FIG. 14 provides a sampling of different window shapes that are contemplated that the present invention. The window 140 has a shape that is similar to the shape currently employed in most modern aircraft. The present invention also contemplates that windows having any of a variety of sizes and shapes may be provided for an aircraft 10.

With respect to the window 140, it is noted that current designs for windows have a similar shape and are manufactured with a height of 16 in. (40.64 cm) and a width of 10.8 in. (27.43 cm). Windows of the present invention are contemplated to present a greater surface area that the traditional design identified.

For example, a square window 142 may be provided. With respect to the square window 142, it is contemplated that the corners of the square window 142 may be rounded to distribute stresses therearound and prevent the creation of any concentrated stresses in the fuselage of the aircraft.

It is also contemplated that the aircraft may be provided with one or more triangular windows 144. A with the square windows 142, it is contemplated that the corners of the triangular windows 144 will be rounded to minimize the accumulation of stresses at the apexes of the triangular window 144.

It is also possible that an amorphous window 146 may be employed. An amorphous window 146 is one that does not have a specific shape but may have any shape selected by the designer of the window 146.

Still other window shapes are contemplated by the present invention. For example, the present invention may provide for an oblong (or oval) window 148. With respect to the oval window 148, it is contemplated that the window 148 will be large enough to extend across two or more rows of seats in the aircraft.

In still further alternative embodiments, it is contemplated that the aircraft 10 may incorporate a diamond-shaped window 150 or a circular window 152. As should be apparent, the window shapes depicted in FIG. 14, are merely representative of a virtually infinite number of window shapes that may be employed by the present invention.

Since the present invention seeks to capitalize on the outward deflection of a window 148 by taking advantage of the deflection, the window 148 may be made lighter in weight, at least because the window 148 does not need to include deflection-minimizing elements. In addition, the window 148 may be made larger in size than prior art windows.

FIG. 15 is a graphical representation of two conditions of a baseline window according to the present invention. The baseline window is a prior art window and is provided as a basis for comparison with FIGS. 16 and 17. The first line, labeled "Position," provides an indication of the position $h_1$ of the baseline window in an unpressurized condition. The second line, labeled "Deflection," illustrates the deflected position $h_2$ of the baseline window when subjected to a differential pressure ΔP as would be experienced at a cruising altitude. As should be apparent from the illustration, the baseline window is essentially a planar window when in the unpressurized condition.

With continued reference to FIG. 15, it is noted that the position $h_1$ of the window in the unpressurized condition is $h_1$=0 inches. In other words, the window pane conforms to the outside mold line of the aircraft 10 when the aircraft is in the unpressurized state. When the aircraft is pressurized, the window bulges outwardly until the pane is at a pressurized position, $h_2$, at −0.08 inches (−2 mm). As noted above, when the value of h is negative, this indicates that the window pane extends outwardly (or bulges outwardly) from the outside mold line of the aircraft 10.

Figure 16:
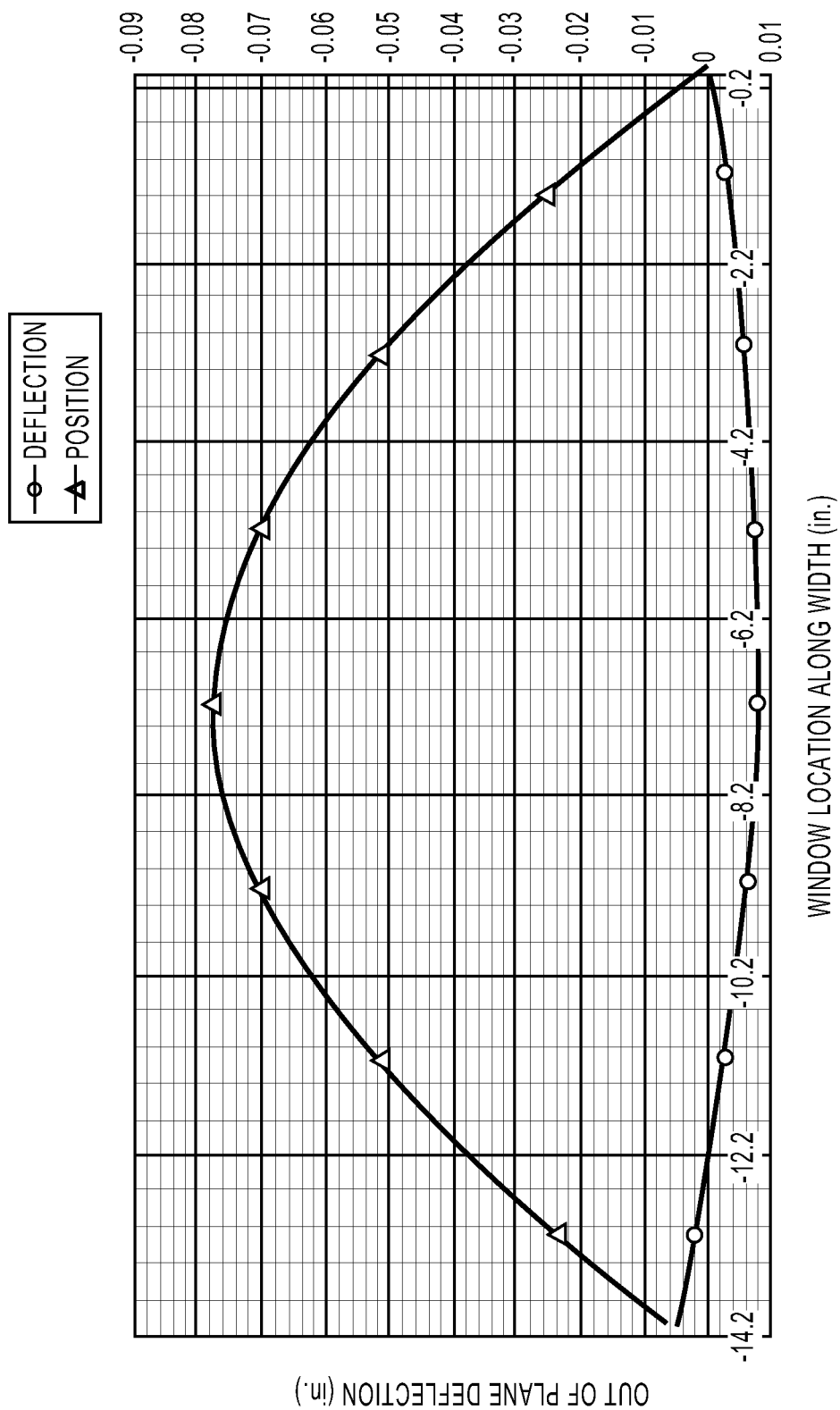
FIG. 16 is a graphical representation of the shape of a shallow reverse curvature window in both a pressurized and an unpressurized condition.

FIG. 16 is a graphical representation of two conditions of a shallow reverse curvature window according to the present invention. As with FIG. 15, the line labeled "Position" illustrates the unpressurized shape of the shallow reverse curvature window. The line labeled "Deflection" illustrates the shape of the shallow reverse curvature window when subjected to a pressure differential ΔP that would be experienced at a cruising altitude.

With respect to the shallow reverse curvature window illustrated in FIG. 16, it is contemplated that this window has a 0.08 inch (2 mm) inward deflection $h_1$ when the aircraft 10 is in an unpressurized condition. As should be apparent from the discussion of the present invention, a deeper or shallower curvature may be employed without departing from the scope of the present invention.

As is apparent from FIG. 16, when the shallow reverse curvature window is subjected to a differential pressure ΔP at a cruising altitude, the window bulges outwardly. In other words, when subjected to the differential pressure, the shallow curvature window will reverse its curvature from a concave shape to a convex shape. In the convex shape, the shallow curvature window is anticipated to bulge outwardly from the exterior of the aircraft. As illustrated in FIG. 16, the pressurized position of the window pane is at a position h2 of about −0.01 inches (−0.25 mm). In this condition, the window pane substantially conforms to the outside mold line of the aircraft.

Figure 17:
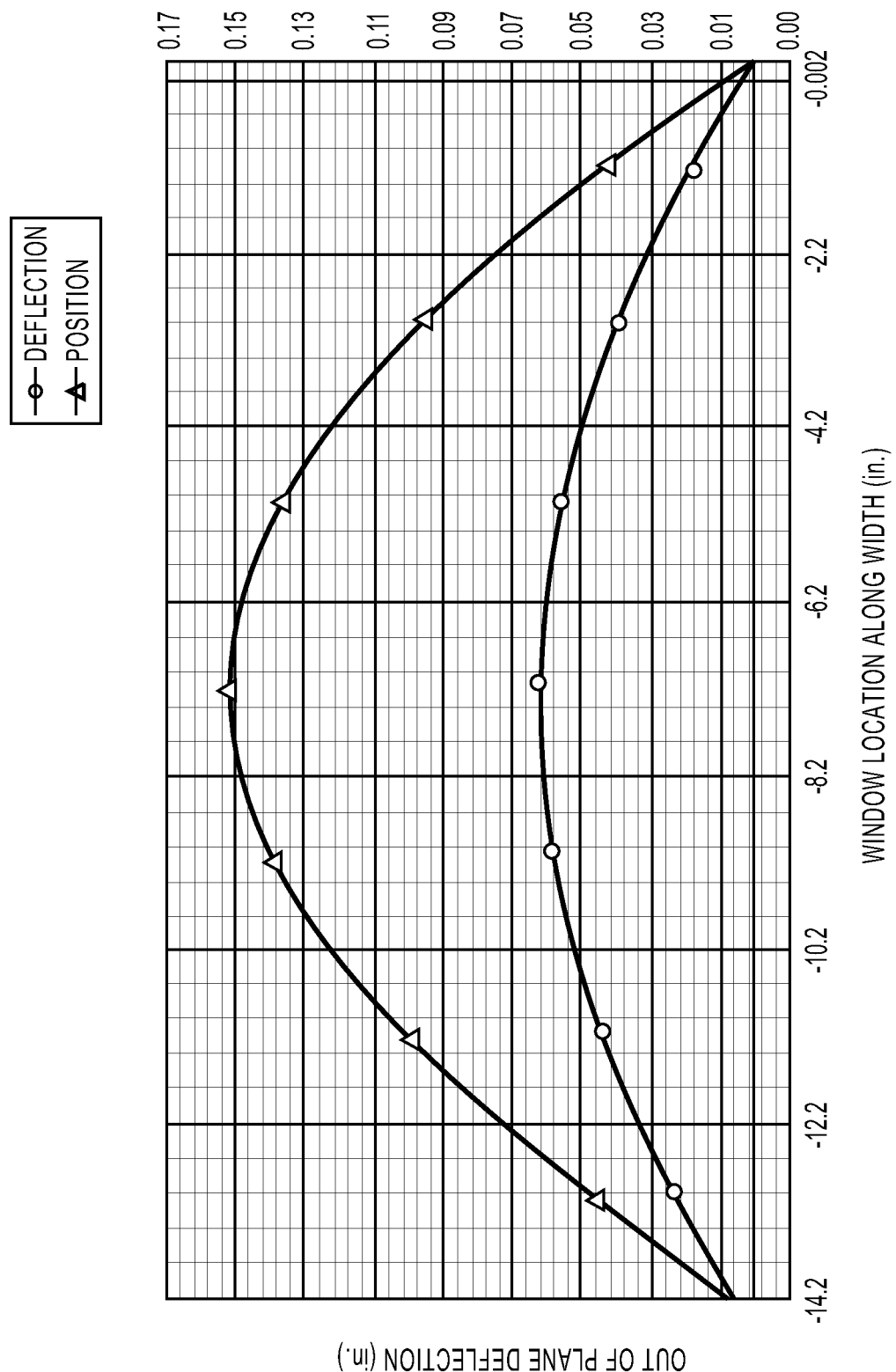
FIG. 17 is a graphical representation of the shape of a deep reverse curvature window in both a pressurized and an unpressurized condition.

FIG. 17 illustrates a deep reverse curvature window according to the present invention. This deep reverse curvature window differs from the shallow reverse curvature design (shown in FIG. 16) in that the reverse curvature is greater than in the prior embodiment when the window is unpressurized. Here, the position $h_1$ of the reverse curvature of the window in an unpressurized state is about 0.15 in. (3.81 mm) or about twice that of the prior embodiment.

As also is apparent from FIG. 17, when the deep reverse curvature window is subjected to a pressure differential ΔP, which occurs at a cruising altitude, the deflection of the window results in a shallow concave shape. In other words, the deep reverse curvature window retains a concave shape in both the unpressurized and the pressurized conditions. In this embodiment, the pressurized position h2 of the window is 0.062 inches (1.57 mm).

Figure 18:
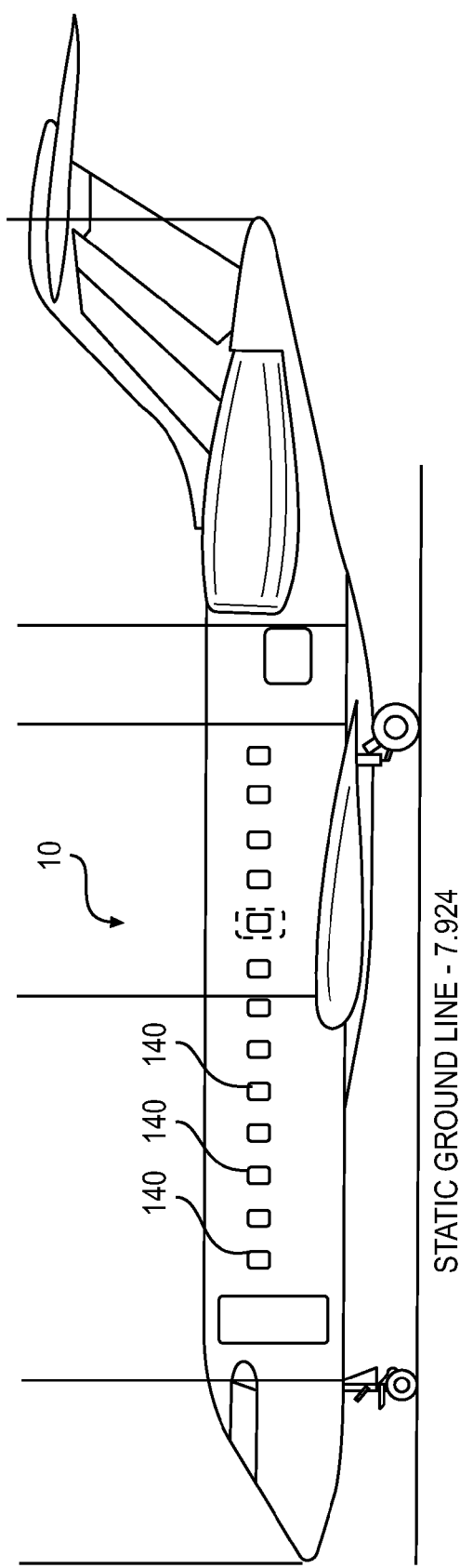
FIG. 18 is graphical illustration of a side view of an aircraft according to the present invention.

FIG. 18 illustrates one embodiment of an aircraft 10 consistent with the teachings of the present invention. The aircraft 10 is depicted merely to provide at least one side view of an aircraft 10 consistent with the teachings of the present invention.

With respect to the present invention, it is contemplated that the window 24, 38 of the present invention will have an unpressurized position that defines a reverse curvature (i.e., $h_1$ is positive). The window 24, 38 will then have a pressurized position $h_2$ that substantially conforms to the outside mold line of the aircraft 10. The pressurized position $h_2$ encompasses a slight bulge of the window 24, 38 outside of the outside mold line.

In the context of the present invention, it is contemplated that the pressurized position $h_2$ will be between about 0.08 and −0.03 inches (2 and −0.76 mm). More specifically, it is contemplated that the pressurized position $h_2$ will lie between about 0.07 to −0.02 inches (1.78 to −0.51 mm). Even more specifically, it is contemplated that the pressurized position $h_2$ will lie between about 0.06 to −0.01 inches (1.52 to −0.25 mm). Specific pressurized positions include, but are not limited to 0.08 inches (2 mm), 0.07 inches (1.78 mm), 0.06 inches (1.52 mm), 0.05 inches (1.27 mm), −0.01 inches (−0.25 mm), −0.02 inches (−0.51 mm), and −0.03 inches (−0.76 mm). Still other pressurized positions $h_2$ are contemplated to fall within the scope of the invention. Moreover, the specific endpoints may be combined to define still further ranges for the pressurized positions $h_2$ of the window 24, 38.

In the context of the present invention, it is contemplated that the unpressurized position $h_1$ will be between about 0.17 and 0.06 inches (4.32 and 1.52 mm). More specifically, it is contemplated that the unpressurized position $h_2$ will lie between about 0.16 to 0.07 inches (4.06 to 1.78 mm). Even more specifically, it is contemplated that the pressurized position $h_2$ will lie between about 0.15 to 0.08 inches (3.81 to 2 mm). Specific pressurized positions include, but are not limited to 0.17 inches (4.32 mm), 0.16 inches (4.06 mm), 0.15 inches (3.81 mm), 0.08 inches (2 mm), 0.07 inches (1.78 mm), 0.06 inches (1.52 mm), and 0.05 inches (1.27 mm). Still other pressurized positions $h_2$ are contemplated to fall within the scope of the invention. Moreover, the specific endpoints may be combined to define still further ranges for the unpressurized positions $h_2$ of the window 24, 38.

For each of the specific embodiments described above in connection with FIGS. 16-17, the windows are based on a 14 inch width, as indicated in the figures. Naturally, if the windows 24, 38 are of a larger size, it is contemplated that the differential distance Δh may be larger or smaller, depend upon the material employed.

As noted above, the present invention encompasses a broad scope. Any discussion of specific details in connection with embodiments is not intended to be limiting of the invention. To the contrary, the specific embodiments described above are intended to illustrate the breadth of the present invention.

What is claimed is:

1. A window for a pressurized vehicle having an outside mold line comprising:
    a frame for the window;
    at least one transparent pane suspended within the frame, wherein the transparent pane comprises a deformable material,
    wherein the transparent pane defines a first surface position $h_1$ when not subjected to a pressure differential thereacross and a second surface position $h_2$ when subject to the pressure differential thereacross, wherein the first and second surface positions are defined with reference to the outside mold line, wherein the first surface position $h_1$ defines a reverse curvature with respect to the outside mold line,
    wherein, in response to the pressure differential ΔP, the second surface position $h_2$ includes bulging of the transparent pane by a predetermined distance Δh from the first surface position $h_1$,
    wherein the frame is constructed to be positioned within the pressurized vehicle such that the transparent pane presents a surface, when subjected to the pressure differential ΔP, that is substantially consistent with the outside mold line of the pressurized vehicle, and
    wherein the first surface position $h_1$ lies between 0.17 and 0.06 inches (4.32 and 1.52 mm) from the outside mold line.

2. The window for a pressurized vehicle of claim 1, wherein the first surface position $h_1$ lies between 0.16 to 0.07 inches (4.06 to 1.78 mm) from the outside mold line.

3. The window for a pressurized vehicle of claim 2, wherein the first surface position $h_1$ lies between 0.15 to 0.08 inches (3.81 to 2 mm) from the outside mold line.

4. The window for a pressurized vehicle of claim 1, wherein the second surface position $h_2$ lies between 0.08 and -0.03 inches (2 and -0.76 mm) from the outside mold line.

5. The window for a pressurized vehicle of claim 4, wherein the second surface position $h_2$ lies between 0.07 to -0.02 inches (1.78 to -0.51 mm) from the outside mold line.

6. The window for a pressurized vehicle of claim 4, wherein the second surface position $h_2$ lies between 0.06 to -0.01 inches (1.52 to -0.25 mm) from the outside mold line.

7. The window for a pressurized vehicle of claim 1, wherein the second surface configuration is substantially drag neutral.

8. The window for a pressurized vehicle of claim 1, wherein the at least one transparent pane comprises:
    a first transparent pane;
    a second transparent pane; and
    an air gap separating the first transparent pane from the second transparent pane.

9. The window for a pressurized vehicle of claim 8, further comprising:
    a seal surrounding the first and second panes and providing an intermediate section disposed between the first and second panes.

10. The window for a pressurized vehicle of claim 1, wherein the at least one transparent pane comprises:
    a first transparent pane;
    a second transparent pane; and
    a transparent, solid interlayer between the first transparent pane to the second transparent pane.

11. The window for a pressurized vehicle of claim 10, wherein the first transparent pane, the second transparent pane, and the interlayer are formed as a unitary structure.

* * * * *